United States Patent
Mao et al.

(10) Patent No.: US 12,486,266 B2
(45) Date of Patent: Dec. 2, 2025

(54) CRYSTALLINE FORM OF JAK INHIBITOR AND APPLICATION THEREOF

(71) Applicant: Zhuhai United Laboratories CO., LTD., Guangdong (CN)

(72) Inventors: Weiwei Mao, Shanghai (CN); Wenyuan Qian, Shanghai (CN); Changqing Wei, Shanghai (CN); Liang Fang, Guangdong (CN); Liwei Mu, Guangdong (CN); Shuhui Chen, Shanghai (CN)

(73) Assignee: ZHUHAI UNITED LABORATORIES CO., LTD., Guangdong (CN)

( * ) Notice: Subject to any disclaimer, the term of this patent is extended or adjusted under 35 U.S.C. 154(b) by 566 days.

(21) Appl. No.: 17/796,613

(22) PCT Filed: Feb. 22, 2021

(86) PCT No.: PCT/CN2021/077228
§ 371 (c)(1),
(2) Date: Jul. 29, 2022

(87) PCT Pub. No.: WO2021/164786
PCT Pub. Date: Aug. 26, 2021

(65) Prior Publication Data
US 2023/0091250 A1    Mar. 23, 2023

(30) Foreign Application Priority Data

Feb. 21, 2020  (CN) .................. 202010110530.7

(51) Int. Cl.
*A61K 31/437*   (2006.01)
*A61P 19/02*   (2006.01)
(Continued)

(52) U.S. Cl.
CPC .......... *C07D 471/04* (2013.01); *A61K 31/437* (2013.01); *A61P 19/02* (2018.01); *A61P 29/00* (2018.01); *C07B 2200/13* (2013.01)

(58) Field of Classification Search
CPC ........ C07D 471/04; A61P 19/02; A61P 29/00; C07B 2200/13; A61K 31/437
(Continued)

(56) References Cited

FOREIGN PATENT DOCUMENTS

| CN | 102105471 A | 6/2011 |
|---|---|---|
| CN | 108341814 A | 7/2018 |

(Continued)

OTHER PUBLICATIONS

Clark, J., et al., "Network pharmacology of JAK inhibitors", PNAS Early Edition, www.pnas.org/cgi/doi/10.1073/pnas.1610253113, 6 pages (2016).
(Continued)

*Primary Examiner* — Taylor V Oh
(74) *Attorney, Agent, or Firm* — Viksnins Harris Padys Malen LLP

(57) ABSTRACT

The present invention discloses the crystal forms as a JAK inhibitor and their application in the preparation of drugs for the treatment of JAK1 or/and TYK2 related diseases.

(Continued)

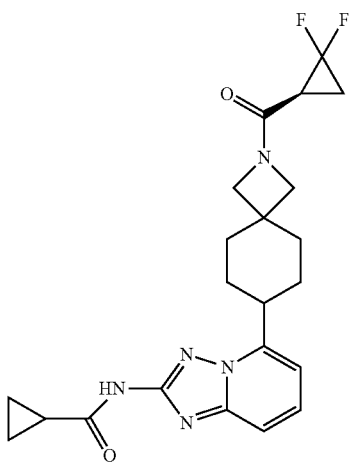

(58) Field of Classification Search
USPC .................................................. 514/210.18
See application file for complete search history.

(56) References Cited

FOREIGN PATENT DOCUMENTS

| CN | 110088105 A | 8/2019 |
|---|---|---|
| WO | 2010149769 A1 | 12/2010 |
| WO | 2018019223 A1 | 2/2018 |
| WO | 2020038457 A1 | 2/2020 |

OTHER PUBLICATIONS

Patent Cooperation Treaty, International Search Report and Written Opinion for PCT/CN2021/077228, 9 pages, dated May 20, 2021. [English Translation].

Roskoski, R, "Janus kinase (JAK) inhibitors in the treatment of inflammatory and neoplastic diseases", Pharmacological Research, http://dx.doi.org/doi:10.1016/j.phrs.2016.07.038, 87 pages (2016).

Schwartz, D, et al., "JAK inhibition as a therapeutic strategy for immune and inflammatory diseases", Nature Reviews Drug Discovery, doi: 10.1038/nrd.2017.201, 20 pages (2017).

Vainchenker, W, et al., "JAKs in pathology: Role of Janus kinases in hematopoietic malignancies and Immunodeficiencies", Seminars in Cell & Developmental Biology 19, 385-393 (2008).

13 Claims, 4 Drawing Sheets

(51) Int. Cl.
*A61P 29/00* (2006.01)
*C07D 471/04* (2006.01)

CRYSTALLINE FORM OF JAK INHIBITOR AND APPLICATION THEREOF

The present application claims the priority of China patent application No. CN202010110530.7 filed on Feb. 21, 2020, which is incorporated herein in its entirety by reference.

TECHNICAL FIELD

The present invention relates to a crystal form as a JAK inhibitor and an application thereof in preparation of drugs for the treatment of JAK1 or/and TYK2 related diseases.

BACKGROUND ART

A JAK kinase is a family of intracellular non-receptor tyrosine kinases with four members: JAK1, JAK2, JAK3 and TYK2 (Robert Roskoski Jr. (2016)). JAK1, JAK2 and TYK2 are expressed in human tissue cells. JAK3 is mainly expressed in hematopoietic tissue cells, primarily in bone marrow cells, thymocytes, NK cells, activated B lymphocytes and T lymphocytes. From an analysis of functionally acquired expression or mutation, JAK1 and JAK3 are more related to immune regulation, while JAK2 is directly related to the generation of red blood cells and platelets. From an analysis of functional deficiency, the functional deficiency of JAK1 and JAK2 will cause the death of mouse embryos of mice. the diseases related to the functional deficiency of JAK1 and JAK2 are not found in human body, which indirectly indicates the importance of physiological functions of JAK1 and JAK2. JAK3 functional deficiency can cause severe comprehensive immune deficiency. There are few studies on the function of TYK2, which has been reported to cause defects related to intrinsic immunity. (James D. Clark, (2014)).

Downstream of JAKs is the signal transduction and transcription activator family (STAT). JAK-STAT pathway transmits extracellular signals from a variety of cytokines, growth factors and hormones to the nucleus and is responsible for the expression of thousands of protein coding genes. When cytokines bind to their receptors, JAK family members are self phosphorylated and/or trans-phosphorylated with each other, then STAT-phosphorylated and then migrated to the nucleus to regulate transcription. JAK-STAT intracellular signal transduction is applicable to interferon, most of interleukins and a variety of cytokines and endocrine factors, such as EPO, TPO, GH, OSM, LIF, CNTF, GM CSF and PRL (Vainchenker W. et al. (2008)). Different JAK family members bind to different cytokine receptors selectively to give signal transduction specificity, so as to play different physiological roles. This selective mode of action renders JAK inhibitors capable of being applied to disease treatment in a relatively specific manner. IL-2 or IL-4 receptors, together with a common γ chain, bind to JAK1 and JAK3, and type I receptor having the same structure β binds to JAK2. Type 1 receptors using gp130 (glycoprotein 130) and type I receptors activated by heterodimer cytokines preferentially bind JAK1/2 and TYK2, and type I receptors activated by hormone like cytokines bind to and activate JAK2 kinase. Type II receptors of an interferon bind to JAK1 and TYK2, while receptors of IL-10 cytokine family bind to JAK1/2 and TYK2. Various specific bindings of the above cytokines and their receptors to JAK family members serve different physiological functions, thereby providing a possibility for the treatment of different diseases.

JAK-STAT signaling pathway is involved in many important biological processes, such as cell proliferation, differentiation, apoptosis and immune regulation. An existing clinical data show that, JAK2 inhibition for a long time will inhibit cytokines such as G-CSF, TPO and EPO, thus affecting the proliferation and differentiation of hematopoietic stem cells. JAK3 inhibition will decrease the number of NK cells and increase the probability of infection. Therefore, JAK inhibitor may affect the number and function of leukocytes, erythrocytes and lymphocytes in varying degrees. However, selective JAK1 or/and TYK2 inhibitors with a narrow range of action on cytokines can theoretically maintain efficacy and improve safety (Daniella M. Schwartz, et al. (2017)).

US2009220688 discloses Filgotinib, which is a drug of Galapagos company in clinical phase III for the treatment of rheumatoid arthritis,

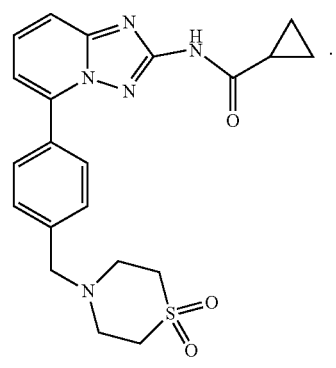

Filgotinib

SUMMARY

The present invention provides crystal form A of a compound of formula (I), with characteristic diffraction peaks shown in a X-ray powder diffraction (XRPD) spectrum at the following 2θ angle: 6.91±0.20°, 12.21±0.20° and 19.06±0.20°.

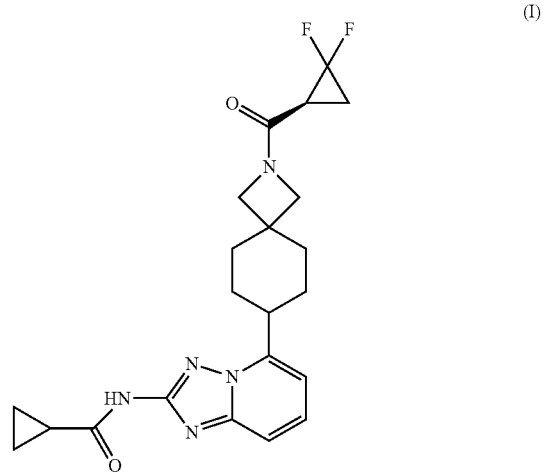 [SMILES: O=C(Nc1nc2cccc(C3CCC4(CC3)CN(C(=O)[C@@H]3CC3(F)F)C4)n2n1)C1CC1]

(I)

In some embodiments of the present invention, characteristic diffraction peaks are present in the X-ray powder diffraction spectrum of the above crystal form A at the following 2θ angles: 6.91±0.20°, 12.21±0.20°, 13.69±0.20°, 19.06±0.20°. 19.86±0.20°, 20.59±0.20°, 22.06±0.20° and 27.52 0.20°.

In some embodiments of the present invention, characteristic diffraction peaks are present in the X-ray powder diffraction spectrum of the above crystal form A at the following 2θ angles: 6.91±0.20°, 10.34±0.20°, 12.21±0.20°, 13.69±0.20°, 18.11±0.20°, 19.06±0.20°, 19.86±0.20°, 20.59±0.20°, 22.06±0.20° and 27.52±0.20°.

In some embodiments of the present invention, characteristic diffraction peaks are present in the X-ray powder diffraction spectrum of the above crystal form A at the following 2θ angles: 6.91±0.200° 10.34±0.20°, 12.21±0.20°, 13.69±0.20°, 17.44±0.20°, 18.11±0.20°, 19.06±0.20°, 19.86±0.20°, 20.59±0.20°, 22.06±0.20°, 24.46±0.20° and 27.52±0.20°.

In some embodiments of the present invention, the above crystal form A has an XRPD spectrum is shown in FIG. 1.

In some embodiments of the present invention, the XRPD spectrum analysis data of the above crystal form A is shown in Table 1.

TABLE 1

Analytical data of XRPD spectrum of crystal form A of compound of formula (I).

| No. | 2θ angle (°) | Relative intensity (%) |
|---|---|---|
| 1 | 6.91 | 100.0 |
| 2 | 10.34 | 13.7 |
| 3 | 12.21 | 64.7 |
| 4 | 13.69 | 23.1 |
| 5 | 14.44 | 9.8 |
| 6 | 16.11 | 3.1 |
| 7 | 17.44 | 12.2 |
| 8 | 18.11 | 18.7 |
| 9 | 18.76 | 11.7 |
| 10 | 19.06 | 76.7 |
| 11 | 19.86 | 32.6 |
| 12 | 20.59 | 28.8 |
| 13 | 22.06 | 24.8 |
| 14 | 22.63 | 6.8 |
| 15 | 23.49 | 2.4 |
| 16 | 24.46 | 12.0 |
| 17 | 25.27 | 4.6 |
| 18 | 25.88 | 8.3 |
| 19 | 26.18 | 4.9 |
| 20 | 26.93 | 2.8 |
| 21 | 27.52 | 18.9 |
| 22 | 28.73 | 2.6 |
| 23 | 29.12 | 8.2 |
| 24 | 29.92 | 6.8 |
| 25 | 31.56 | 6.9 |
| 26 | 31.86 | 9.6 |
| 27 | 32.43 | 6.0 |
| 28 | 32.64 | 7.2 |
| 29 | 33.04 | 2.5 |
| 30 | 33.30 | 2.3 |
| 31 | 34.52 | 10.0 |
| 32 | 35.21 | 3.9 |
| 33 | 35.56 | 2.8 |

In some embodiments of the present invention, the above crystal form A has an endothermic peak value respectively at 152.19±3° C. and 216.79±3° C. on a differential scanning calorimetry curve, and an exothermic peak value at 161.50±3° C.

In some embodiments of the present invention, the above crystal form A has a DSC spectrum shown in FIG. 2.

The present invention provides a crystal form B of the compound of formula (I), with characteristic diffraction peaks in an X-ray powder diffraction spectrum at the following 2θ angles: 5.13±0.20°, 19.14±0.20° and 21.18±0.200.

In some embodiments of the present invention, characteristic diffraction peaks are present in the X-ray powder diffraction spectrum of the above crystal form B at the following 2θ angles: 5.13±0.20°, 7.34±0.20°, 10.14±0.20°, 10.56 0.20°, 11.72±0.20°, 16.67±0.20°, 19.14±0.20° and 21.18 5 0.20°.

In some embodiments of the present invention, characteristic diffraction peaks are present in the X-ray powder diffraction spectrum of the above crystal form B at the following 2θ angles: 5.13±0.20°, 7.34±0.20°, 10.14±0.20°, 10.56±0.20°, 11.72±0.20°, 16.67±0.20°, 19.14±0.20°, 21.18±0.20° and 21.78±0.20°.

In some embodiments of the present invention, the above crystal form B has an XRPD spectrum shown in FIG. 3.

In some embodiments of the present invention, the XRPD spectrum analysis data of the above crystal form B is shown in Table 2.

TABLE 2

Analytical data of XRPD spectrum of crystal form B of compound of formula (I)

| No. | 2θ angle (°) | Relative intensity (%) |
|---|---|---|
| 1 | 5.13 | 65.7 |
| 2 | 7.34 | 43.4 |
| 3 | 10.14 | 27.3 |
| 4 | 10.56 | 23.7 |
| 5 | 11.46 | 13.7 |
| 6 | 11.72 | 42.7 |
| 7 | 14.64 | 2.1 |
| 8 | 16.67 | 27.0 |
| 9 | 16.86 | 13.6 |
| 10 | 18.84 | 22.5 |
| 11 | 19.14 | 55.0 |
| 12 | 20.31 | 3.7 |
| 13 | 21.18 | 100.0 |
| 14 | 21.78 | 20.5 |
| 15 | 22.03 | 9.3 |
| 16 | 22.54 | 14.2 |
| 17 | 22.96 | 13.2 |
| 18 | 24.52 | 4.1 |
| 19 | 25.27 | 11.5 |
| 20 | 26.06 | 9.0 |
| 21 | 26.61 | 4.1 |
| 22 | 27.03 | 7.2 |
| 23 | 27.69 | 2.0 |
| 24 | 28.45 | 2.5 |
| 25 | 28.97 | 5.5 |
| 26 | 29.49 | 8.8 |
| 27 | 29.81 | 2.8 |
| 28 | 30.41 | 6.7 |
| 29 | 30.72 | 3.4 |
| 30 | 31.15 | 3.2 |
| 31 | 32.00 | 3.1 |
| 32 | 32.35 | 3.0 |
| 33 | 33.34 | 3.6 |
| 34 | 33.65 | 2.3 |
| 35 | 37.00 | 2.5 |
| 36 | 38.60 | 2.8 |
| 37 | 39.66 | 2.1 |

In some embodiments of the present invention, the above crystal form B has an endothermic peak value respectively at 193.99±3° C. and 216.93±3° C. on a differential scanning calorimetry curve: and an exothermic peak value at 200.10±3° C.

In some embodiments of the present invention, the above crystal form B has a DSC spectrum shown in FIG. 4.

In some embodiments of the present invention, the above crystal form B shows a weight loss of up to 0.535% in a thermogravimetric analysis curve (TGA) at 120±3° C.

In some embodiments of the present invention, the above crystal form B has a TGA spectrum shown in FIG. 5.

The present invention provides a crystal form C of the compound of formula (I), with characteristic diffraction peaks in an X-ray powder diffraction spectrum at the following 2θ angles: 8.92±0.20°, 18.66±0.20° and 20.26±0.20°.

In some embodiments of the present invention, characteristic diffraction peaks are present in the X-ray powder diffraction spectrum of the above crystal form C at the following 2θ angles: 5.76±0.20°, 8.92±0.20°, 11.50±0.20°, 16.35±0.20°, 18.66±0.20°, 19.17±0.20°, 20.26±0.20° and 24.79±0.20°.

In some embodiments of the present invention, the above crystal form C has an XRPD spectrum shown in FIG. 6.

In some embodiments of the present invention, the XRPD spectrum analysis data of the above crystal form C is shown in Table 3.

TABLE 3

Analytical data of XRPD spectrum of crystal form C of compound of formula (I).

| No. | 2θ angle (°) | Relative intensity (%) |
| --- | --- | --- |
| 1 | 5.76 | 19.3 |
| 2 | 8.92 | 31.2 |
| 3 | 11.50 | 13.9 |
| 4 | 14.28 | 11.4 |
| 5 | 16.35 | 23.6 |
| 6 | 17.54 | 11.4 |
| 7 | 17.99 | 7.5 |
| 8 | 18.66 | 29.0 |
| 9 | 19.17 | 22.1 |
| 10 | 20.26 | 100.0 |
| 11 | 22.98 | 6.2 |
| 12 | 24.79 | 24.0 |
| 13 | 29.77 | 5.1 |

In some embodiments of the present invention, the above crystal form C has a starting point of endothermic peak at 215.48° C. on a differential scanning calorimetry curve.

In some embodiments of the present invention, the above crystal form C has a DSC spectrum shown in FIG. 7.

The present invention provides a crystal form D of the compound of formula (I), with characteristic diffraction peaks in an X-ray powder diffraction spectrum at the following 2θ angles: 7.12±0.20°, 20.54±0.20° and 21.42±0.20°.

In some embodiments of the present invention, characteristic diffraction peaks are present in the X-ray powder diffraction spectrum of the above crystal form D at the following 2θ angles: 7.12±0.20°, 12.45±0.20°, 14.64±0.20°, 18.31±0.20°, 20.54±0.20°, 21.42±0.20° and 28.72±0.20°.

In some embodiments of the present invention, characteristic diffraction peaks are present in the X-ray powder diffraction spectrum of the above crystal form D at the following 2θ angles: 7.12±0.20°, 10.28±0.20°, 12.45±0.20°, 14.64±0.20°, 17.50±0.20°, 18.31±0.20°, 20.54±0.20°, 21.42±0.20° and 28.72±0.20°.

In some embodiments of the present invention, the above crystal form D has an XRPD spectrum shown in FIG. 8.

In some embodiments of the present invention, the XRPD spectrum analysis data of the above crystal form D is shown in Table 4.

TABLE 4

Analytical data of XRPD spectrum of crystal form D of compound of formula (I)

| No. | 2θ angle (°) | Relative intensity (%) |
| --- | --- | --- |
| 1 | 7.12 | 100.0 |
| 2 | 10.28 | 12.3 |
| 3 | 10.68 | 2.7 |
| 4 | 12.45 | 36.0 |
| 5 | 13.04 | 7.2 |
| 6 | 14.28 | 26.7 |
| 7 | 14.64 | 30.4 |
| 8 | 16.06 | 3.1 |
| 9 | 17.30 | 7.2 |
| 10 | 17.50 | 10.8 |
| 11 | 18.31 | 16.1 |
| 12 | 20.54 | 77.4 |
| 13 | 20.93 | 20.5 |
| 14 | 21.42 | 44.1 |
| 15 | 21.84 | 7.9 |
| 16 | 23.95 | 3.0 |
| 17 | 24.50 | 5.1 |
| 18 | 25.74 | 4.3 |
| 19 | 26.69 | 4.9 |
| 20 | 27.24 | 2.5 |
| 21 | 28.72 | 17.0 |
| 22 | 29.49 | 5.0 |
| 23 | 31.80 | 4.3 |
| 24 | 34.05 | 7.8 |
| 25 | 36.04 | 6.1 |

The invention further provides the application of the above crystal forms A, B, C and D in preparing drugs for treatment of JAK1 and/or TYK2 related diseases.

In some embodiments of the invention, in the above application, the drug is a drug for the treatment of rheumatoid arthritis.

Technical Effect

The compound of formula (I) according to the present invention has good drug effect in vivo, and its crystal forms are stable and less affected by light, heat and humidity, and have high solubility, thereby having a broad prospect as a medicine.

Definition and Description

Unless otherwise stated, the following terms and phrases used herein are intended to have the following meanings. A specific phrase or term should not be considered uncertain or unclear without a special definition, but should be understood according to an ordinary meaning. When a trade name appears herein, it is intended to refer to its corresponding commodity or its active ingredients.

The intermediate compound of the invention can be prepared by a variety of synthesis methods well known to those skilled in the art, including the specific embodiments listed below, the embodiments formed by its combination with other chemical synthesis methods, and the equivalent replacement methods well known to those skilled in the art. The preferred embodiments include but are not limited to the embodiments of the present invention.

The chemical reaction of the specific embodiments of the present invention is completed in a suitable solvent, which are suitable for the chemical changes of the invention and the required reagents and materials. In order to obtain the compounds of the present invention, it is sometimes necessary for those skilled in the art to modify or select a synthesis step or reaction process on the basis of the existing embodiments.

The present invention will be described in connection with examples which, however, will not impose any limitation to the present invention.

All solvents used in the invention are commercially available and can be used without the need of further purification.

The solvent used in the invention can be commercially available. The following abbreviations are used in the present invention: DCM representing dichloromethane: DMF representing N,N-dimethylformamide; DMSO representing dimethyl sulfoxide; EtOH representing ethanol: MeOH representing methanol; TFA representing trifluoroacetic acid; TsOH representing p-toluenesulfonic acid: mp representing melting point; $EtSO_3H$ representing ethanesulfonic acid; $MeSO_3H$ representing methanesulfonic acid; ATP representing adenosine triphosphate; HEPES representing 4-hydroxyethyl piperazine ethanesulfonic acid; EGTA representing ethylene glycol bis(2-aminoethyl ether) tetraacetic acid; $MgCl_2$ representing magnesium dichloride; $MnCl_2$ representing manganese dichloride; DTT representing dithiothreitol; DCC representing Dicyclohexylcarbodiimide; DMAP representing 4-dimethylaminopyridine; EA representing ethyl acetate; LiHMDS representing hexamethyldisilicylaminolithium; $Pd(dppf)Cl_2 \cdot CH_2Cl_2$ represents the dichloromethane complex of [1,1'-bis(diphenylphosphino)ferrocene]palladium dichloride; EDCI representing 1-ethyl-3(3-dimethylpropylamine) carbodiimide; and HOBt representing 1-hydroxybenzotriazole.

Specific Methods of XRPD, DSC and TGA (Including Equipment Model and Parameters)

A Powder X-Ray Diffraction (XRPD) Method Used in the Present Invention

About 10-20 mg of sample is used for XRPD detection. The detailed XRPD parameters are as follows:
Light tube: Cu, Cu: K-Alpha (λ=1.54179 Å).
Light tube voltage: 40 kV, light tube current: 40 mA
Divergent slit: 0.60 mm
Detector slit: 10.50 mm
Anti-scattering slit: 7.10 mm
Scanning range: 3-40 deg
Scanning speed: 10 deg/min
Sample disk speed: 15 rpm/0 rpm A Differential Calorimetric Scanner (DSC) Method Used in the Present Application A sample (0.5-1 mg) is put into a DSC aluminum pot for test. Under the condition of 50 ml/min $N_2$, the sample is heated from 30° C. to 250° C. at a heating rate of 10° C./min.

A Thermogravimetric Analyzer (TGA) Method Used in the Present Application

A sample (2-5 mg) is put into TGA platinum pot for test. Under the condition of 25 ml/min $N_2$, the sample is heated from room temperature to 300° C. or heated to lose weight of 20% at a heating rate of 10° C./min.

A Liquid Chromatography Analysis Method (HPLC) Used in the Present Application

HPLC Method for Content Test and Analysis

| | |
|---|---|
| Apparatus | Shimadzu high performance liquid chromatograph |
| Column | Zorbax SB C18, 4.6 mm * 150 mm, 5 μm (PDS-HPLC-007) |
| Mobile phase A | 0.1% TFA aqueous solution |
| Mobile phase B | Pure acetonitrile |
| Current Speed | 1 mL/min |
| Injection volume | 5 μL |
| Detection wavelength | 254 nm |
| Column temperature | 40° C. |
| Diluent | 1/1(v/v) Acetonitrile:pure water |
| Time | 15 min |

| Gradient elution procedure | Time (min) | Mobile phase A (%) | Mobile phase B (%) |
|---|---|---|---|
| | 0.01 | 90 | 10 |
| | 10.00 | 10 | 90 |
| | 13.00 | 10 | 90 |
| | 13.01 | 90 | 10 |
| | 15.00 | 90 | 10 |
| | 15.01 | | STOP |

DETAILED DESCRIPTION

Figure 1:
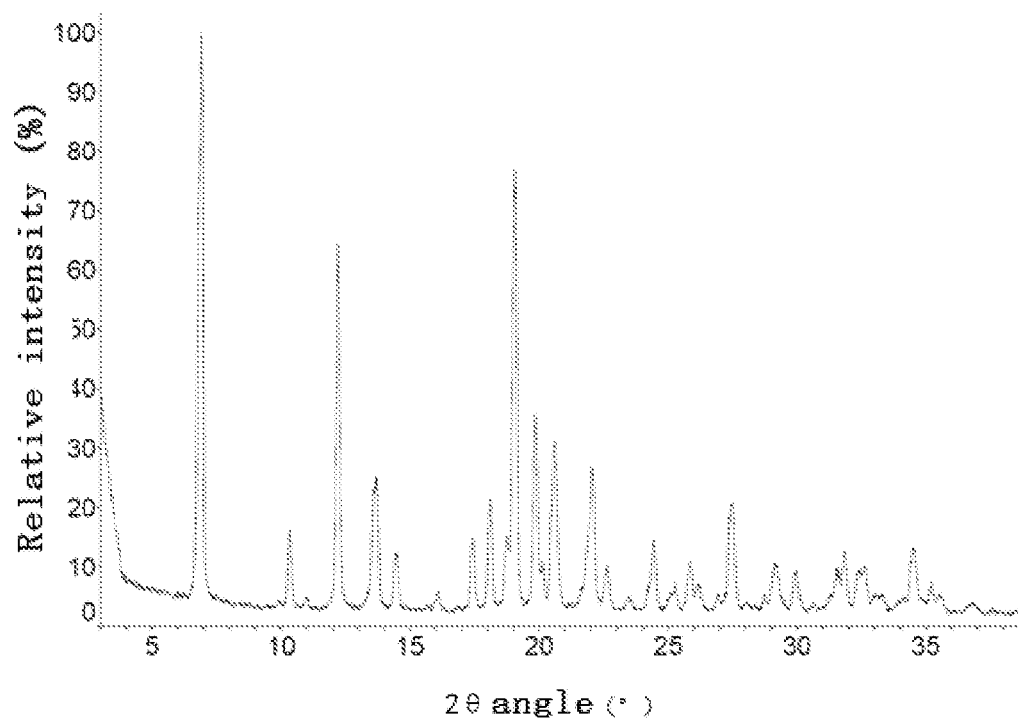
FIG. 1: XRPD spectrum of crystal form A.

In order to better understand the content of this invention, the following will be further described in combination with specific examples, however, specific embodiments are not intended to impose any limitation to the scope of this invention.

Example 1: Preparation of Compound of Formula (I)

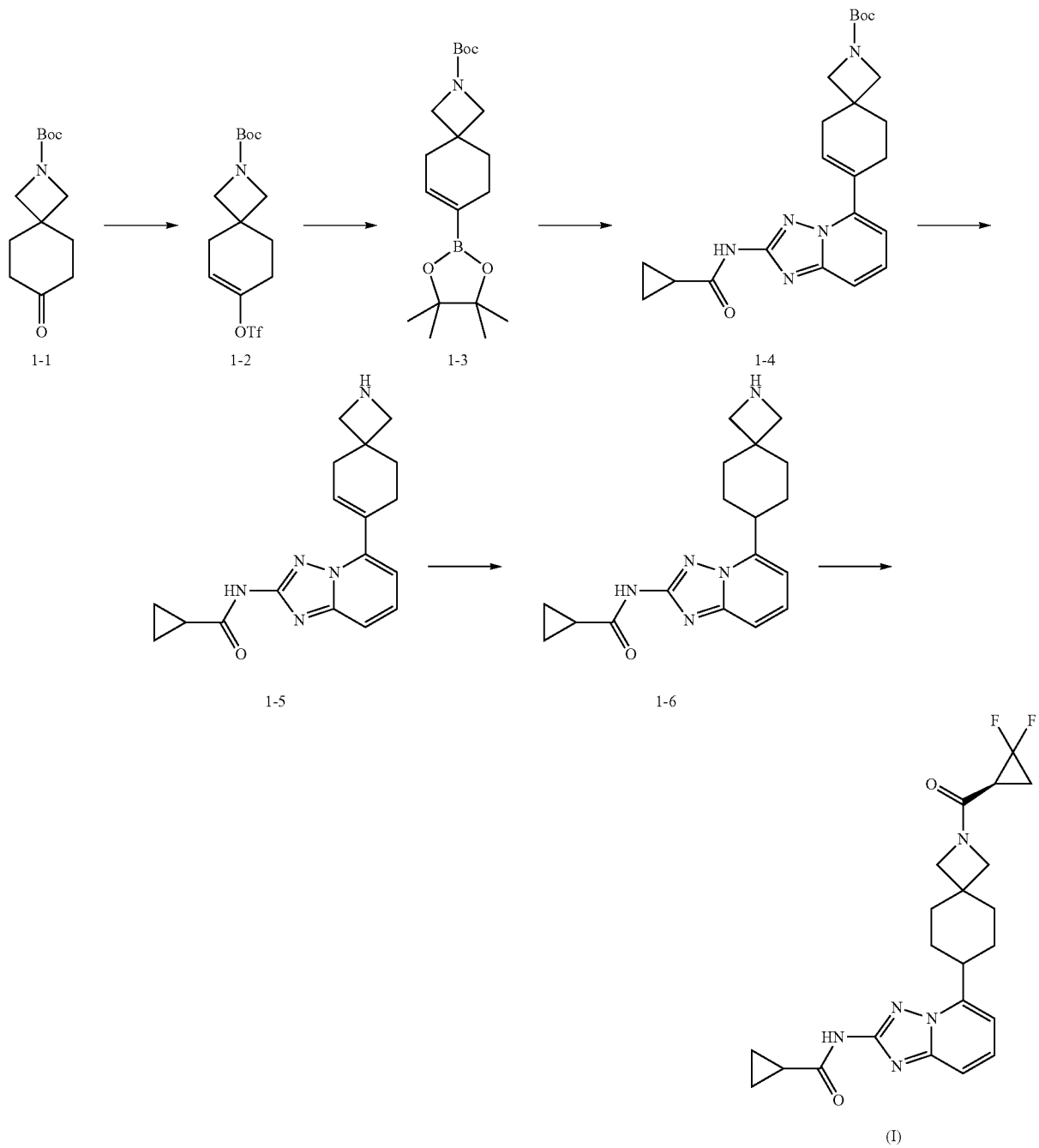

Step 1: LiHMDS (1 M, 51.2 mL) was dropped into THF (150 ml) solution containing compound 1-1 (10.2 g, 42.6 mmol) at −78° C. After the reaction solution was stirred at −78° C. for 1 hour, THF (150 ml) solution of 1,1,1-trifluoro-N-phenyl-N-(trifluoromethylsulfonyl) methanesulfonamide (16.7 g, 46.9 mmol) was added to the reaction solution, and then the mixture was stirred at 15° C. for 12 hours. The reaction was quenched with 250 mL saturated ammonium chloride, diluted with 200 mL of water, and then extracted with ethyl acetate (200 mL*3). The organic phases were combined, washed with saturated salt water, dried with sodium sulfate, filtered and concentrated to obtain compounds 1-2. The crude product was directly used for the next reaction without purification.

$^1$H NMR (400 MHz, CDCl$_3$) δ 5.63 (br s, 1H), 3.50-3.65 (m, 4H), 2.34 (br s, 4H), 1.88 (br t, J=5.90 Hz, 2H), 1.37 (s, 9H).

Step 2: potassium acetate (12.7 g, 129.3 mmol) and Pd(dppf)Cl$_2$·CH$_2$Cl$_2$ (3.5 g, 4.3 mmol) were added to DMF (100 ml) solution dissolved with compound 1-2 (16 g, 43.1 mmol) and pinacol borate (12.0 g, 47.4 mmol), it was replaced with nitrogen for 3 times and stirred at 70° C. in nitrogen atmosphere for 3 hours. The reaction solution was dispersed in a mixture of 300 ml of water and 400 ml of ethyl acetate. The organic phase was separated, washed with saturated salt water, dried with sodium sulfate, filtered and concentrated to obtain a crude product. The crude product was purified by silica gel chromatography to obtain compound 1-3.

$^1$H NMR (400 MHz, CDCl$_3$) δ 6.46 (br s, 1H), 3.71-3.53 (m, 4H), 2.31 (br d, J=3.0 Hz, 2H), 2.24-2.16 (m, 2H), 1.74 (t, J=6.3 Hz, 2H), 1.44 (s, 9H), 1.26 (s, 12H).

Step 3: in a nitrogen atmosphere, potassium carbonate (3.8 g, 27.3 mmol) and Pd (dppf)Cl$_2$.CH$_2$Cl$_2$ (744 mg, 911.0 μmol) were added to a dioxane (60 ml) and water (15 ml) solution containing compound 1-3 (3.5 g, 10.0 mmol) and N-(5-bromo-[1,2,4] triazolo [1,5-a] pyridin-2-yl) cyclopropane formamide (2.6 g, 9.1 mmol). The reaction solution was stirred at 90° C. for 3 hours. The reaction solution was concentrated, and the resulting crude product was separated and purified by column chromatography to obtain compound 1-4. LCMS (ESI) m/z: 424.3[M+H]$^+$.

Step 4: hydrochloric acid/ethyl acetate (4 M, 30 ml) were added to dichloromethane (10 ml) solution dissolved with compounds 1-4 (3.5 g, 8.2 mmol), and the reaction solution was stirred at 25° C. for 0.5 hours. The solid was precipitated, filtered and dried to obtain compound 1-5 (3.3 g hydrochloride, crude product), which was directly used in the next reaction without purification.

LCMS (ESI) m/z: 324.1 [M+H]$^+$.

Step 5: Pd/C (1 g, 10%) was added to a methanol (100 ml) solution dissolved with compound 1-5 (3.0 g, 8.34 mmol, hydrochloride) in a nitrogen atmosphere. It was replaced with hydrogen for three times and then stirred at 30° C. in hydrogen atmosphere (30 psi) for 12 hours. The reaction solution was filtered and concentrated to obtain compound 1-6 (3 g hydrochloride, crude product), which was directly used in the next reaction without purification.

LCMS (ESI) m/z: 326.2 [M+H]$^+$.

Step 6: compound 1-6 (0.87 g, 2.40 mmol, hydrochloride) was dissolved in N, N-dimethylformamide (10 ml), HOBt (487 mg, 3.6 mmol) and EDCI (691 mg, 3.6 mmol) were added, and then (1S)-2,2-difluorocyclopropyl formic acid (323 mg, 2.6 mmol) and diisopropyl ethylamine (621 mg, 4.8 mmol) were added into the solution. The reaction solution was stirred at 15° C. for 12 hours. Then it was concentrated under reduced pressure to obtain a residue, which was subjected to a preparative HPLC (neutral system) to obtain the compound of formula (I).

$^1$H NMR (400 MHz, CD$_3$OD) δ 7.32-7.73 (m, 2H), 6.95 (br s, 1H), 3.62-4.22 (m, 4H), 3.45 (br s, 1H), 3.18-3.37 (m, 1H), 2.61 (br s, 1H), 1.45-2.27 (m, 10H), 0.78-1.17 (m, 4H). LCMS (EST) m/z: 430.0[M+H]$^+$.

Figure 2:
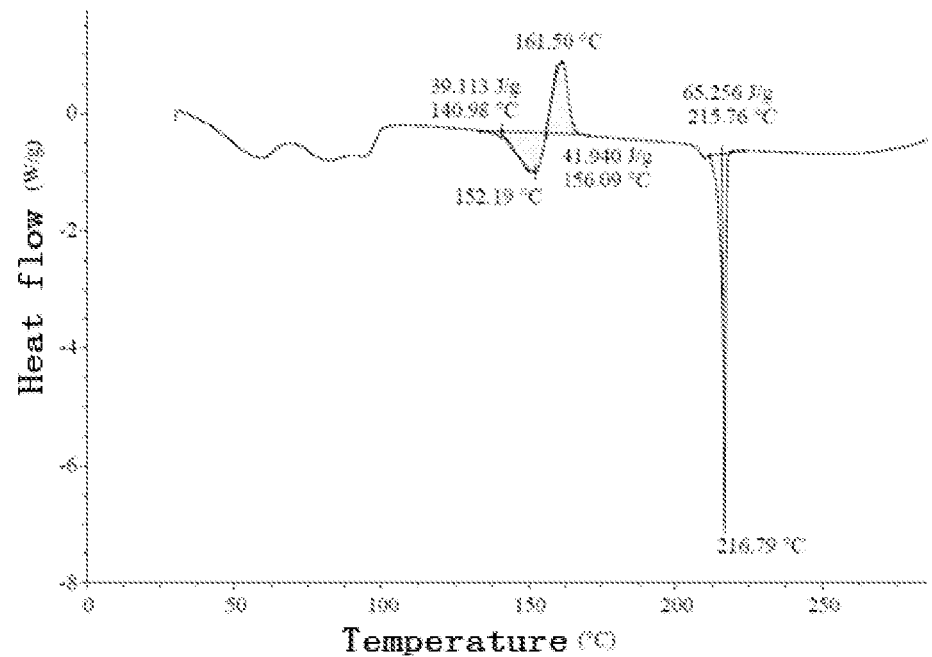
FIG. 2: DSC spectrum of crystal form A.

Example 2: Preparation Method of Individual Crystal Forms 50 mg of compound of formula (I) was put into 2.0 ml glass vial, and 0.4 ml of mixture of methanol and water (volume ratio 1:1) was added to obtain a suspension. The suspension was added with magnetons, and stirred on a heated magnetic stirrer (40° C.). After stirring for 100 hours, the suspended samples were centrifuged and placed in a 35° C. vacuum drying oven overnight. The dried sample was determined to be crystal form A of the compound of formula (I) by XRPD (as shown in FIG. 1) and DSC (as shown in FIG. 2) at the same time.

Figure 3:
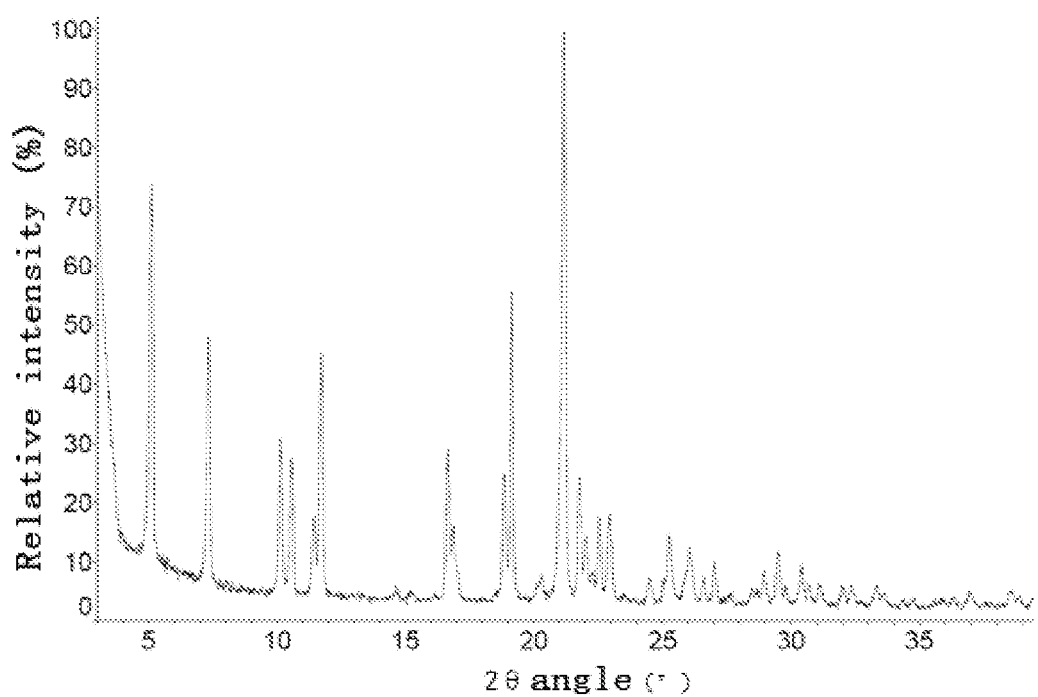
FIG. 3: XRPD pattern of crystal form B.
Figure 4:
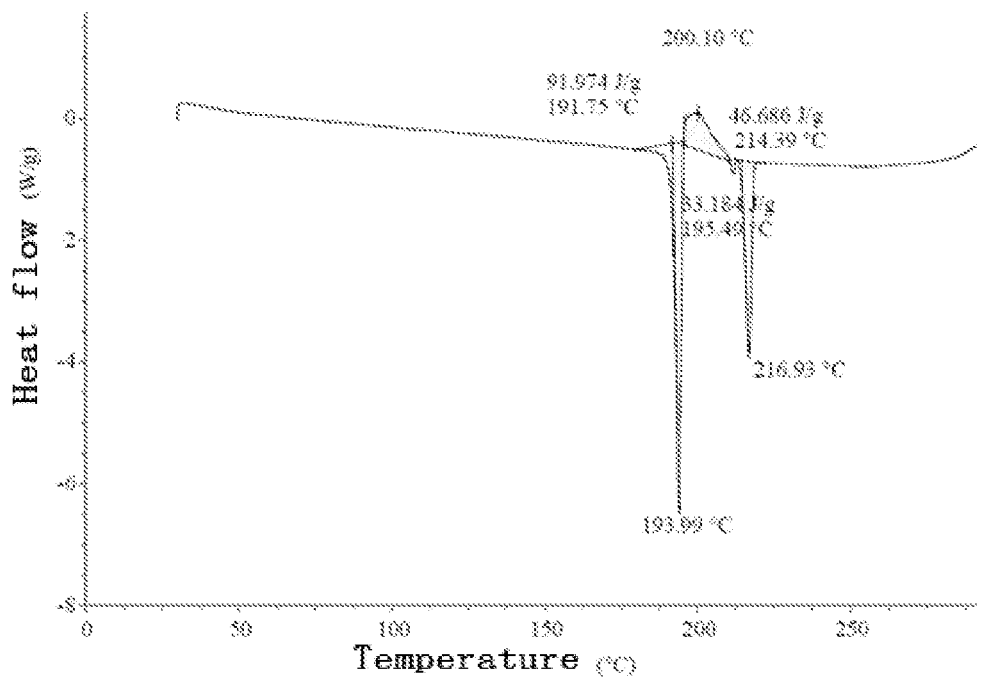
FIG. 4: DSC spectrum of crystal form B.
Figure 5:
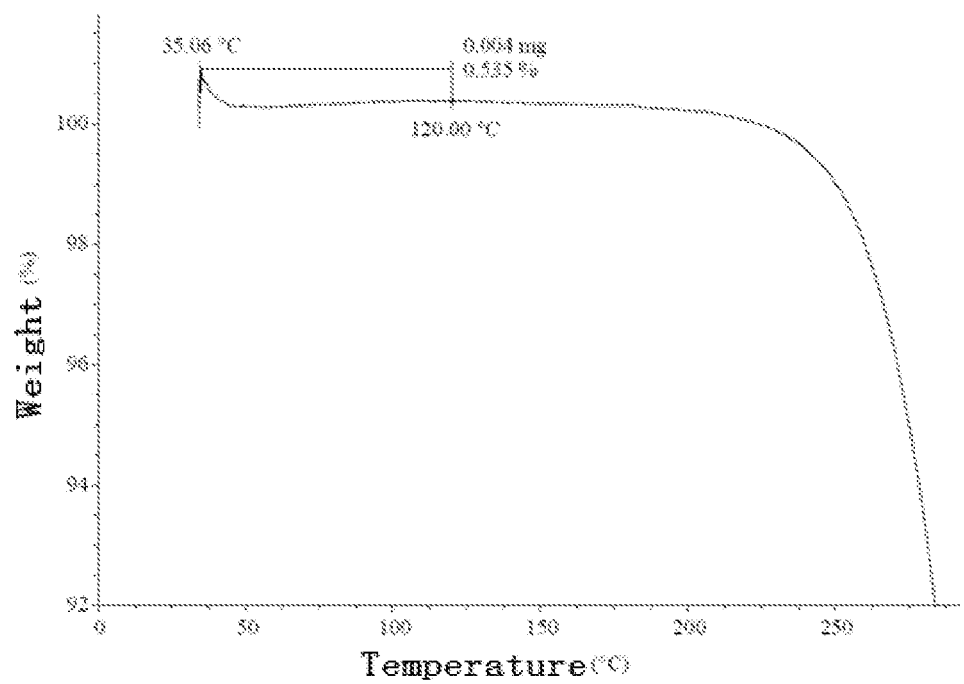
FIG. 5: TGA spectrum of crystal form B.

About 50 mg of the compound of formula (I) was added into a 2.0 ml glass vial and 0.4 ml of ethyl acetate was added. After adding magnetons, the above sample was stirred on a heated magnetic stirrer (40° C.). After stirring for 100 hours, the suspended sample was centrifuged and placed in a 35° C. vacuum drying oven overnight. The dried sample was determined to be crystal form B of the compound of formula (I) by XRPD (as shown in FIG. 3) and DSC (as shown in FIG. 4) and TGA (as shown in FIG. 5) at the same time.

Figure 6:
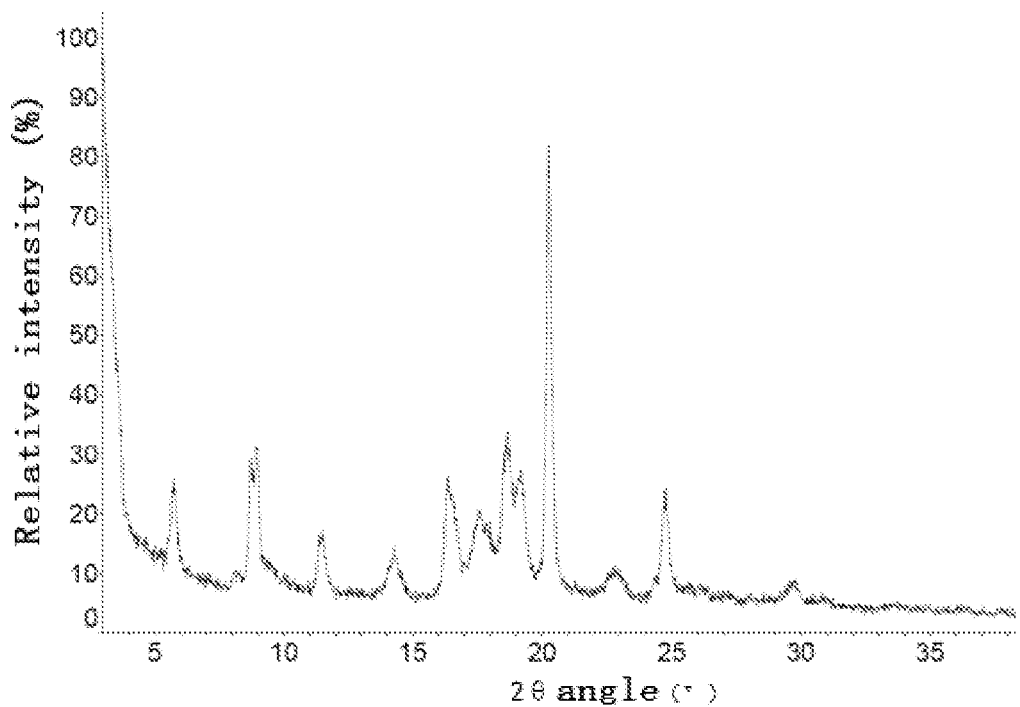
FIG. 6: XRPD pattern of crystal form C.
Figure 7:
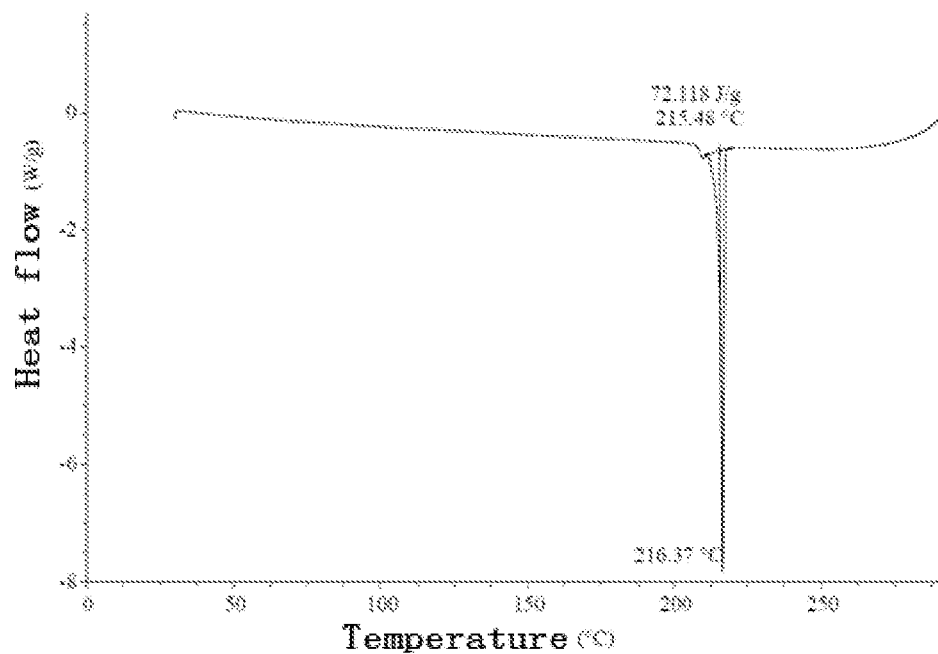
FIG. 7: DSC spectrum of crystal form C.

The crystal form A of the compound of formula (I) was heated to 170° C., and the crystal form A was changed to a new crystal form, that is, crystal form C of the compound of formula (I), as confirmed by XRPD (as shown in FIG. 6) and DSC (as shown in FIG. 7) at the same time.

Figure 8:
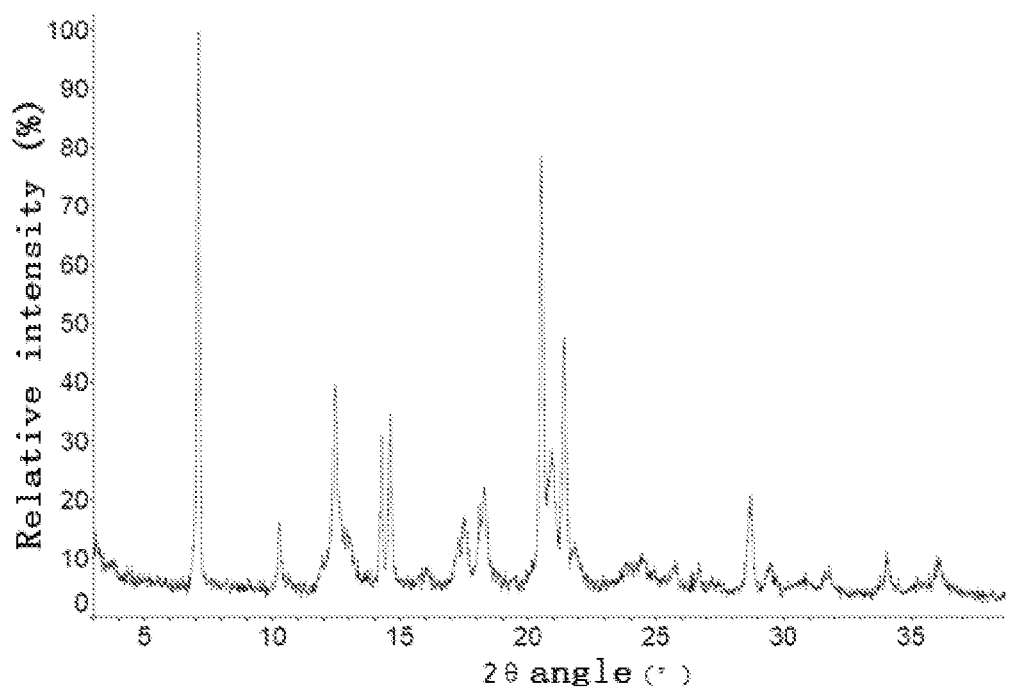
FIG. 8: XRPD spectrum of crystal form D.

About 50 mg of compound of formula (I) was added into 2.0 ml glass vial, and 0.4 ml of mixture of ethanol and water (volume ratio 1:1) was added to obtain a suspension. The suspension was added with magnetons, and stirred on a heated magnetic stirrer (40° C.). After stirring for 100 hours, the suspended sample was centrifuged and placed in a 35° C. vacuum drying oven overnight. The dried sample was determined to be crystal form D of the compound of formula (I) by XRPD (as shown in FIG. 8).

Example 3: Study on Solid Stability of Crystal Form B of Compound of Formula (I)

About 5 mg of crystal form B was placed in a dry and clean glass bottle, spread into a thin layer, which was as a formal test sample. It was placed under the test conditions of influencing factors (60° C., 92.5% RH) and acceleration conditions (40° C./75% RH and 60° C./75% RH). The samples were completely exposed, covered with aluminum foil paper and penetrated with small holes. Samples were collected and analyzed at 5 and 10 days. The samples placed under light (visible light 1200000 lux, UV 200 W) were fully exposed at room temperature.

The experimental results showed that the crystal form does not change under the conditions of influencing factors (high temperature –60° C., high humidity-92.5% RH, light) and acceleration (40° C./75% RH and 60° C./75% RH).

Example 4: Study on Biological Medium Solubility of Crystal Form B of Compound of Formula (I)

1. Bioassay Solubility Experiment of Crystal Form B

About 2 mg of sample of crystal form B was added into a sample bottle, and then 1.0 mL of different solvents [pure water, SGF (simulated gastric juice), FaSSIF (simulated intestinal juice in fasting state), FeSSIF (simulated intestinal juice in eating state)] were added and shaken, respectively. The bottle was shaken on a constant temperature oscillator at 37° C. After shaking for 24 hours, it was centrifuged, and an obtained supernatant was tested for its solubility. After the supernatant was diluted (diluent ACN/H$_2$O (1/1)) for a certain number of times (due to a low solubility of the compound, the supernatant was diluted twice, except for SGF, which was diluted by 10 times), the concentration was determined by HPLC.

2 Preparation of Diluent and Mobile Phase

Diluent: acetonitrile:water=1:1. Mobile phase A: 0.1% TFA aqueous solution, for example; 1 ml of TFA was transferred into 1 L of pure water, mixed evenly, and degassed with ultrasound. Mobile phase B: 100% acetonitrile.

3 Preparation of Reference Substance and Sample Solution

Preparation of STD solution: crystal form B was used as the reference substance. About 5 mg of the reference substance was added into a glass bottle, dissolved with 10 mL diluent, and it was dissolved fully by ultrasound for about 10 min, then cooled to room temperature and shaken. Two parallel portions were prepared and correspondingly marked as STD1 and STD2. The corresponding STD1 was diluted with diluent by 10, 100, 1000 and 2000 times, and tested by a standard curve.

Preparation of sample solution: after the supernatant was diluted (diluent ACN/$H_2O$ (1/1)) for a certain number of times (the solubility of the compound is small, the supernatant is diluted twice except SGF, and the SGF is diluted 10 times), shook it well, put it into a 1.5 ml liquid phase vial to be tested, and the concentration was determined by HPLC.

4. Results of Solubility in Biological Media

TABLE 5

Results of solubility in biological medium of crystal form B

| Buffer solution | $H_2O$ | SGF | FeSSIF | FaSSIF |
|---|---|---|---|---|
| pH (24 h) | 7.02 | 1.91 | 5.09 | 6.52 |
| Solubility (mg/ml) 24 hr | 0.211 | 0.727 | 0.166 | 0.214 |

LOQ = 0.0001 267 mg/ml;
Y=7778034.55X − 1509.46

Experimental conclusion: the crystal form B has a good solubility in simulated biological media, which is conducive to obtain good bioavailability in vivo.

Biological Activity Test

Experimental Example 1: In Vitro Activity Test of JAK1, JAK2, JAK3 and TYK2 Kinases Experimental Materials Recombinant human JAK1, JAK2, JAK3, TYK2 protease, main instruments and reagents were provided by Eurofins in the UK.

Experimental Method

Dilution of JAK2, JAK3 and TYK2: 20 mM 3-(N-morpholine) propanesulfonic acid (MOPS), 1 mM EDTA, 0.01% Brij-35.5% glycerol, 0.1% β-Mercaptoethanol, 1 mg/ml BSA; Dilution of JAK1: 20 mM TRIS, 0.2 mM EDTA, 0.1% β-Mercaptoethanol, 0.01% Brij-35.5% glycerol. All compounds were prepared into 100°% DMSO solution and reached 50 times the final determined concentration. The test compound was diluted by three times the concentration gradient, with a final concentration of 10 μM to 0.001 μM, 9 concentrations in total. The content of DMSO in the detection reaction was 2%. The working stock solution of the test compound was added to a determination hole as a first component of reaction, and then the remaining components were added according to the scheme detailed in the determination method below.

JAK1 (H) Enzyme Reaction

JAK1 (h), together with 20 mM Tris/HCl, pH75, 0.2 mM EDTA, 500 μM MGEEPLYWSFPAKKK, 10 mM magnesium acetate and [γ-$^{33}$P]-ATP (activity and concentration of which were tailored as needed) were incubated together. Mg/ATP mixture was added to start the reaction. After incubation at room temperature for 40 minutes, 0.5% phosphoric acid was added to terminate the reaction. Then 10 μL of the reactant was dripped on a P30 filter pad, washed with 0.425% phosphoric acid for three times and then with methanol for one time within 4 minutes, dried and counted by scintillation.

JAK2 (h) Enzyme Reaction

JAK2(h), together with 8 mM MOPS, pH 7.0, 0.2 mM EDTA, I00 μM KTFCGTPEYLAPEVRREPRILSEE-EQEMFRDFDYIADWC, 10 mM magnesium acetate and [γ-$^{33}$P]-ATP (activity and concentration of which were tailored as needed) were incubated. Mg/ATP mixture was added to start the reaction. After incubation at room temperature for 40 minutes, 0.5% phosphoric acid was added to terminate the reaction. Then 10 μL of the reactant was dripped on a P30 filter pad, washed with 0.425% phosphoric acid for three times and then with methanol for one time within 4 minutes, dried and counted by scintillation.

JAK3 (h) Enzyme Reaction

JAK3 (h), together with 8 mM MOPS, pH 7.0, 0.2 mM EDTA, 500 μM GGEEEEYFELVKKKK, 10 mM magnesium acetate and [γ-$^{33}$P]-ATP (activity and concentration of which were tailored as needed) were incubated. Mg/ATP mixture was added to start the reaction. After incubation at room temperature for 40 minutes, 0.5% phosphoric acid was added to terminate the reaction. Then 10 μL of the reactant was dripped on a P30 filter pad, washed with 0.425% phosphoric acid for three times and then with methanol for one time within 4 minutes, dried and counted by scintillation.

TYK2 (h) Enzyme Reaction

TYK2 (h), together with 8 mM MOPS, pH 7.0, 0.2 mM EDTA, 250 μM GGMEDIYFEFMGGKKK, 10 mM magnesium acetate and [γ-$^{33}$P]-ATP (activity and concentration of which were tailored as needed) were incubated. Mg/ATP mixture was added to start the reaction. After incubation at room temperature for 40 minutes, 0.5% phosphoric acid was added to terminate the reaction. Then 10 μL of the reactant was dripped on a P30 filter pad, washed with 0.425% phosphoric acid for three times and then with methanol for one time within 4 minutes, dried and counted by scintillation.

Data Analysis $IC_{50}$ results were obtained from the analysis of XLFIT5 (205 formula) of IDBS company. See Table 6 for details.

TABLE 6

In vitro screening test results of the compound according to the present application

| Compound | TYK2 ($IC_{50}$, nM) | JAK1 ($IC_{50}$, nM) | JAK2 ($IC_{50}$, nM) | JAK3 ($IC_{50}$, nM) |
|---|---|---|---|---|
| Compound of formula (I) | 36 | 3 | 37 | 1517 |

Conclusion: the compound of formula (I) according to the present invention shows a good selective inhibition of JAK1 and/or TYK2 in the in vitro activity test of four kinase subtypes JAK1, JAK2, JAK3 and TYK2.

Experimental Example 2: Pharmacokinetic (PK) Test

A clear solution obtained after dissolving the test compound was administered to male mice (C57BL/6) or rats (SD) (fasting overnight, 7-8 weeks old) via tail vein and gavage. After administration of the test compound, blood was collected separately from mandibular vein at 0.117, 0.333, 1, 2, 4, 7 and 24 hours in a group of intravenous injection (2 mg/kg) and 0.25, 0.5, 1, 2, 4, 8 and 24 hours in a group of gavage (15 mg/kg), and centrifuged to obtain a plasma. Drug concentration in the blood was determined by LC-MS/MS, and WinNonlin™ Version 6.3 pharmacokinetic software was used to calculate the relevant pharmacokinetic parameters by non atrioventricular model linear logarithm trapezoid method. The test results are as follow:

TABLE 7

PK test results of compound of formula (1) in mice

| PK parameter | Results |
|---|---|
| $T_{1/2}$ (hr) | 1.61 |
| $C_{max}$ (nM) | 5105 |
| $AUC_{0-inf}$ (nM.hr) | 9917 |
| Bioavailability (%)$^a$ | 38.1% |

Note:
$T_{1/2}$: half life;
$C_{max}$: peak concentration;
$AUC_{0-inf}$ the area under the plasma concentration time curve from time 0 to extrapolation to infinity;

Bioavailability: bioavailability.

Conclusion: the compound of formula (I) of the invention has good oral bioavailability and high exposure in mice, which is conducive to producing good drug efficacy in vivo.

Experimental Example 3: In Vivo Pharmacodynamic Study of Collagen Induced Arthritis (CIA) in Mice Purpose of the Experiment:

Rheumatoid arthritis (RA) is a kind of frequently occurring autoimmune disease, with a global incidence rate of about 1%. It is due to autoimmune reaction that causes joint inflammation, injury and deformity, and, in severe cases, will cause systemic inflammatory reaction. Research and development of drugs for RA will help alleviate the symptoms of rheumatoid arthritis and improve the quality of life of patients. Collagen induced mouse arthritis model is often used to evaluate the efficacy of drugs in the treatment of RA, and its pathogenesis and symptoms are significantly correlated with RA diseases. The model is injected with type II collagen to activate the reactivity of B cells and T cells to bone collagen, and the activated B cells and T cells enter a joint to cause joint damage, which leads to a series of symptoms similar to human rheumatoid arthritis. Collagen induced arthritis in mice is often used to evaluate its effectiveness in preclinical evaluation of candidate compounds for drug treatment of rheumatoid arthritis.

The purpose of this experiment is to investigate therapeutic effect of compound of formula (I) and reference compound Filgotinib on collagen induced arthritis in mice, so as to provide preclinical pharmacodynamic information for subsequent clinical studies.

Experimental Method:

1. Type II Collagen/Complete Freund's Adjuvant Immunization

Preparation of acetic acid: 2N acetic acid was diluted to 100 mM, filtered with 0.22 micron filter membrane, and stored at 4° C.

Bovine type II collagen solution: bovine type II collagen (CII) was dissolved in 100 mM acetic acid solution and stored at 4° C. overnight. A final concentration of the collagen was 8 mg/ml.

Preparation of an emulsion: the CII solution stored overnight was mixed with equal volume of complete Freund's adjuvant, homogenized on a high-speed homogenizer on ice at 30000 rpm for about 60 minutes until the solution formed a stable emulsion.

2. Induction of Arthritis:

Mice were randomly assigned to different treatment groups. The day for the first immunization was recorded as day 0, and the subsequent days were marked in order.

DBA/1 mice were anesthetized with isoflurane and injected subcutaneously into the tail (2-3 cm from the root of the tail) with 50 µl of prepared collagen emulsion (including 200 µg of CII). On the 21st day, the same volume of collagen emulsion was injected into the tail with the same method. Mice in the normal group were not immunized.

3. Administration and Dose Design

On the 28th day, when the average clinical score reached about 1 score, 50 mice with moderate incidence were selected and randomly divided into 5 treatment groups according to their weight and score, with 8 mice in each group.

Dexamethasone (DEX.), as a reference drug to measure whether the model is successfully established, was administered by a dose of 0.3 mg/kg (the dose commonly used in CIA model). In addition, according to results of a pre experiment in the early stage of this experiment, the relevant dose design of the test compound and the reference compound Filgotinib were determined, as shown in Table 8-1: a first group was normal mice without any treatment; a second group was given control group containing only solvent; a third group was given dexamethasone at a dose of 0.3 mg/kg; a sixth group and an eighth group were given 15 mg/kg and 15 mg/kg, respectively. The mice were administered twice a day for 14 days.

TABLE 8-1

Group and dose design

| Group | Name of drugs to be tested | Number | Administration method | Concentration mg/mL | dose mg/kg | Frequency |
|---|---|---|---|---|---|---|
| G1 | Normal | 5 | N/A | N/A | N/A | N/A |
| G2 | Blank (solvent control group) | 8 | p.o. | N/A | N/A | bid, 14 days |
| G3 | Dexamethasone (Dex.) | 8 | p.o | 0.03 | 0.3 | qd, 14 days |
| G6 | Compound of formula (I) | 8 | p.o | 1.5 | 15 | bid, 14 days |
| G8 | Filgotinib | 8 | p.o. | 1.5 | 15 | bid, 14 days |

Note:
PO: oral administration; bid: twice a day; qd: once a day.

4. Determination of Arthritis Incidence Index

Clinical observation: the basic health status and weight changes of DBA/1 mice were observed every day from 7 days before immunization to 21 days after immunization (recorded once a week). After the 22nd day, the health status, morbidity and weight changes of mice were observed every day (recorded at least three times a week) until an end of the experiment.

Clinical scoring: after enhanced immunity, the incidence of mice was observed every day. Upon an onset of the disease (clinical symptoms of arthritis), the mice were scored as 0-4 points according to the different degrees of the disease (redness, swelling, joint deformation). The maximum score of each limb was 4 points, and the maximum score of each animal was 16 points. The scoring criteria are shown in Table 8-2. Scoring was performed at least three times a week.

TABLE 8-2

Clinical scoring criteria of arthritis

| Scores | Clinical symptoms |
|---|---|
| 0 | No erythema and swelling |
| 1 | Erythema or mild redness and swelling near the tarsal bone or ankle or metatarsal bone, and redness and swelling of one toe |
| 2 | Slight erythema and swelling of ankle and metatarsal, or more than two toes |
| 3 | Moderate erythema and swelling of ankle, wrist and metatarsal |
| 4 | Ankle, wrist, metatarsal and toe being all severely red and swollen |

5. Statistical Processing

The experimental data were expressed by mean f standard error (mean±SEM), and the area under the curve (AUC) was analyzed by one-way ANOVA, (P<0.05) was considered significant difference.

Experimental Results:

1. Clinical Score and Incidence Rate:

On the $28^{th}$ day after the first immunization (the $7^{th}$ day after the second immunization), the mice began to develop clinical symptoms of arthritis. Administration was started on the $28^{th}$ day. The detailed results of the experiment were shown in Table 8-3: the average clinical score of the solvent control group gradually increased to 5.8 on the $41^{st}$ day, suggesting a successful establishment of the collagen induced arthritis model. The compound of formula (I) and Filgotinib at the same dose of 15 mg/kg can significantly reduce the clinical score of arthritis mice at the end point of the experiment (the $41^{st}$ day). At this dose, the average clinical score of compounds of formula (I) and Filgotinib was decreased to 1.5 and 5.6 (see Table 8-3 for values). It can be seen that the compound of formula (I) can effectively reduce collagen induced arthritis at 15 mg/kg, 0.3 mg/kg Dexamethasone (G3 group) can significantly inhibit the clinical score of the collagen induced arthritis. The clinical score maintained at about 0.3 from the $27^{th}$ day and decreased to 0 on the $31^{st}$ day (The clinical score was decreased to 0, Please see Table 8-3 for values).

TABLE 8-3

* Average clinical score in the present application

| Days | G2 control group | G3 Dex. | G6 compound of formula (I) | G8 Filgotinib | G1 normal group |
|---|---|---|---|---|---|
| 21 | 0.00 ± 0.00 | 0.00 ± 0.00 | 0.00 ± 0.00 | 0.00 ± 0.00 | 0.00 ± 0.00 |
| 24 | 0.00 ± 0.00 | 0.00 ± 0.00 | 0.00 ± 0.00 | 0.00 ± 0.00 | 0.00 ± 0.00 |
| 27 | 0.38 ± 0.18 | 0.25 ± 0.16 | 0.50 ± 0.19 | 0.25 ± 0.16 | 0.00 ± 0.00 |
| 28 | 0.50 ± 0.19 | 0.50 ± 0.27 | 0.63 ± 0.26 | 0.63 ± 0.26 | 0.00 ± 0.00 |
| 29 | 1.38 ± 0.38 | 0.25 ± 0.16 | 1.00 ± 0.38 | 0.88 ± 0.40 | 0.00 ± 0.00 |
| 31 | 2.50 ± 0.73 | 0.00 ± 0.00 | 1.38 ± 0.53 | 1.88 ± 0.81 | 0.00 ± 0.00 |
| 34 | 4.25 ± 0.73 | 0.00 ± 0.00 | 1.50 ± 0.63 | 2.63 ± 0.82 | 0.00 ± 0.00 |
| 36 | 4.75 ± 1.08 | 0.00 ± 0.00 | 1.75 ± 0.67 | 3.88 ± 1.27 | 0.00 ± 0.00 |
| 38 | 5.38 ± 1.00 | 0.00 ± 0.00 | 1.88 ± 0.77 | 4.88 ± 1.39 | 0.00 ± 0.00 |
| 41 | 5.75 ± 0.96 | 0.00 ± 0.00 | 1.50 ± 0.71 | 5.63 ± 1.45 | 0.00 ± 0.00 |

Note:
mean clinical score ± standard error

By analyzing the clinical score curve of each animal in each group, the area under the curve (AUC) was calculated, and the inhibition rate of individual administration groups relative to the solvent control group was calculated through an average AUC between groups. The detailed results are shown in Table 8-4: the compound of formula (I) and Filgotinib can reduce the clinical score AUC of arthritis animals at the same dose of 15 mg/kg, and the inhibition rates are 59.9% and 18.7%, respectively. Dexamethasone can also significantly reduce the clinical score of arthritis animals, with an inhibition rate of 97.3%.

TABLE 8-4

* Area under incidence curve

| | G2 control group | G3 Dex. | G6 compound of formula (1) | G8 Filgotinib |
|---|---|---|---|---|
| AUC ± SEM | 51.75 ± 10.97 | 1.38 ± 0.81 | 20.75 ± 8.05 | 42.06 ± 12.50 |
| Inhibition rate | N/A | 97.3% | 59.9% | 18.7% |

*Note:
the value of the area under the curve is fit by Graphpad Prism ® software based on the clinical data of the animal, representing the areas under the incidence curve of each group and each mouse during the administration period. Inhibition rate = (average value of area under the curve of control group − average value of area under the curve of administration group)/average value of area under the curve of the control group Various treatment factors can also affect the incidence of the collagen induced arthritis. The detailed results of the experiment are shown in Table 8-5: the incidence rate of compounds of formula (I) reached 63% on the $29^{th}$ day and maintained until the end of the experiment (see Table 8-5 for specific values). The incidence rate of Filgotinib group decreased after the first administration, and then gradually increased until it rose to 100% after the last administration. The incidence of arthritis in the solvent control group reached and maintained at 100% on the $34^{th}$ day after immunization. The incidence rate of the positive control 0.3 mg/kg Dexamethasone group began to decrease after administration and decreased to 0% on the 31$^{st}$ day.

TABLE 8-5

\* Incidence rate in the present application

| Days | G2 control group | G3 Dex. | G6 compound of formula (I) | G8 Filgotinib | G1 normal group |
|---|---|---|---|---|---|
| 21 | 0% | 0% | 0% | 0% | 0% |
| 24 | 0% | 0% | 0% | 0% | 0% |
| 27 | 38% | 25% | 50% | 25% | 0% |
| 28 | 50% | 38% | 50% | 50% | 0% |
| 29 | 75% | 25% | 63% | 50% | 0% |
| 31 | 75% | 0% | 63% | 75% | 0% |
| 34 | 100% | 0% | 63% | 88% | 0% |
| 36 | 100% | 0% | 63% | 88% | 0% |
| 38 | 100% | 0% | 63% | 88% | 0% |
| 41 | 100% | 0% | 63% | 100% | 0% |

\*Note:
incidence rate = number of animals in each group/total number of animals in each group \*100%

2. Weight

The detailed results of the experiment were shown in Table 8-6: compared with the normal group, the body weight of mice decreased after immune modeling. The body weight of individual administration groups decreased from the 28$^{th}$ day to the 34$^{th}$ day, and then the body weight began to increase slowly. Dexamethasone group had the largest weight loss, but there was no significant difference compared with other groups. There was no significant difference between the compound of formula (I) and Filgotinib, having a basically same change trend of body weight (see Table 8-6 for specific values), suggesting that the compound has little effect on the body weight of mice.

TABLE 8-6

\* Average body Veight in the present application

| Days | G2 control group | G3 Dex. | G6 compound of formula (I) | G8 Filgotinib | G1 normal group |
|---|---|---|---|---|---|
| 21 | 22.38 ± 0.23 | 22.41 ± 0.26 | 22.38 ± 0.30 | 22.63 ± 0.27 | 22.30 ± 1.10 |
| 24 | 21.89 ± 0.67 | 22.36 ± 0.20 | 22.33 ± 0.37 | 22.50 ± 0.33 | 23.00 ± 1.07 |
| 27 | 21.96 ± 0.63 | 22.35 ± 0.25 | 21.99 ± 0.44 | 22.25 ± 0.32 | 23.22 ± 1.11 |
| 28 | 22.14 ± 0.56 | 22.43 ± 0.26 | 22.08 ± 0.51 | 22.30 ± 0.35 | 23.12 ± 1.12 |
| 29 | 21.89 ± 0.47 | 21.51 ± 0.23 | 21.59 ± 0.41 | 21.95 ± 0.40 | 22.30 ± 1.15 |
| 31 | 21.64 ± 0.48 | 21.24 ± 0.23 | 21.80 ± 0.58 | 21.61 ± 0.49 | 23.78 ± 1.17 |
| 34 | 22.21 ± 0.54 | 20.71 ± 0.26 | 22.18 ± 0.53 | 21.46 ± 0.57 | 23.70 ± 1.24 |
| 36 | 22 40 ± 0.52 | 21.28 ± 0.20 | 22.53 ± 0.47 | 21.84 ± 0.61 | 24.26 ± 1.36 |
| 38 | 21.79 ± 0.44 | 19.91 ± 0.20 | 22.09 ± 0.40 | 20.88 ± 0.54 | 23.56 ± 1.32 |
| 41 | 23.06 ± 0.49 | 20.84 ± 0.30 | 22.99 ± 0.34 | 22.30 ± 0.52 | 24.24 ± 1.42 |

\*Note:
mean weight ± standard error

Conclusion: in the models of collagen induced arthritis (CIA) in mice, the compound of formula (I) shows good disease treating effect, has no significant effect on the body weight of mice, and is better than that of Filgotinib in mice at the same dose.

Experimental Example 4: In Vivo Pharmacodynamic Study of Adjuvant Induced Arthritis (AIA) in Rats Purpose of the Experiment:

Adjuvant induced arthritis (AIA) rat model is one of the commonly used animal models in rheumatoid arthritis disease research and new drug development. Its pathogenesis and clinical symptoms are similar to human rheumatoid arthritis disease. In this model, the injection of *Mycobacterium tuberculosis* into the foot pad induced immune cells and antibodies with bone and joint injury function, which caused a systematic response, including joint swelling, osteolysis, synovial injury and other symptoms similar to human rheumatoid arthritis. The purpose of this experiment is to evaluate the therapeutic effect of the compound of formula (I) on adjuvant induced arthritis rat model, using Dexamethasone and Filgotinib as reference compounds. There are 8 groups in this experiment: normal group, solvent control group (Vehicle Group), 1 mg/kg BID, 3 mg/kg BID, 10 mg/kg BID and 30 mg/kg BID dose groups of the compound of formula (I), positive drug Dexamethasone 0.3 mg/kg QD group and reference compound Filgotinib 30 mg/kg bid dose group. All rats, except for the normal group, are injected subcutaneously with Freund's complete adjuvant to induce arthritis on day 0. According to the experimental protocol, groups are divided according to body weight and scored on the 13$^{th}$ day, and the administration was continued for 14 days. During the experiment, the body weight, foot volume (measured three times a week after the 13$^{th}$ day) and clinical score are monitored. At the end of the experiment, the right hind foot of rats is collected for hematoxylin eosin staining (HE) staining and pathological score analysis.

Experimental Method

1. Arthritis Model

Adjuvant preparation: 100 mg of *Mycobacterium tuberculosis* H37Ra was weighed, ground for about 5 minutes, 3 mL of paraffin oil was added to dissolve the powder, and transferred to a brown dispensing bottle. Then the mortar was washed twice with 3 mL and 4 mL of paraffin oil, respectively, and the obtained solution was transferred to the brown dispensing bottle to reach a final concentration of 10 mg/mL. Ultrasonic crushing was performed, including ultrasonic treating in ice water mixture for about 30 minutes.

2. Induction of Arthritis

The prepared adjuvant was shaken and mixed, extracted with 1 mL glass syringe (20 G needle) and then with 25 G needle to eliminate bubbles. The rats were anesthetized with isoflurane. Before immunizing each of the rats, the syringe was placed upside down to fully mix *Mycobacterium tuberculosis*. After anesthesia, 0.1 mL adjuvant was injected subcutaneously into a sole of a left foot of a rat. 0.1 mL of paraffin oil was injected subcutaneously into a sole of a normal rat. The day for adjuvant injection was day 0.

3. Administration

On the 13$^{th}$ day, all animals showed arthritis symptoms such as foot erythema or swelling. They were stratified and randomly divided into groups according to score, foot volume and weight. See Table 9-1 for grouping. 70 rats were divided into 7 groups, 10 rats in each group and 5 rats in the normal group. According to Table 9-1, the dosage of each group was as follows. The volume of intragastric administration was 5 mL/kg. The compound was administered twice a day for 14 days.

TABLE 9-1 grouping and dose design

| Group | Test drags | Number | Administrating method | Concentration mg/mL | Dose mg/kg | Frequency |
|---|---|---|---|---|---|---|
| G1 | Normal group (Normal) | 5 | N/A | N/A | N/A | N/A |
| G2 | Solvent control group (Vehicle) | 10 | p.o. | N/A | N/A | bid, 14 days |
| G3 | Dexamethasone (Dex) | 10 | p.o. | 0.06 | 0.3 | qd, 14 days |
| G4 | Filgotinib | 10 | p.o. | 6 | 30 | bid, 14 days |
| G5 | Compound of formula (I) | 10 | p.o. | 0.2 | 1 | bid, 14 days |
| G6 | Compound of formula (I) | 10 | p.o. | 0.6 | 3 | bid, 14 days |
| G7 | Compound of formula (I) | 10 | p.o. | 2 | 10 | bid, 14 days |
| G8 | Compound of formula (I) | 10 | p.o. | 6 | 30 | bid, 14 days |

4. Determination of Arthritis Incidence Index

Weight: weighed three times a week from the 13$^{th}$ day to the 27$^{th}$ day.

Foot volume: measured once before immunization, and three times a week from the 13$^{th}$ day to the 27$^{th}$ day.

Score: scored three times a week from the 13$^{th}$ day to the 27$^{th}$ day. According to different degrees of lesions (redness swelling, joint deformation), score is evaluated according to the standard of 0-4 points. The maximum score of each limb is 4 points, and the maximum score of each animal is 12 points (except for the left hindlimb on the injection side). The scoring criteria are shown in Table 9-2.

TABLE 9-2

Arthritis clinical scoring criteria

| Score | Clinical symptoms |
|---|---|
| 0 | No erythema, and redness swelling |
| 1 | Erythema or mild redness swelling near the tarsus or ankle or metatarsal, or erythema and redness swelling on one toe |
| 2 | Slight erythema and swelling of ankle joint and metatarsal bone, and redness swelling and erythema of two or more toes |
| 3 | Moderate erythema and swelling of ankle, wrist and metatarsal |
| 4 | Severe redness and swelling of ankle, wrist, metatarsal and toe |

5. Pathological Analysis

On the 27$^{th}$ day, the rats were euthanized. After blood collection, the right hind foot of rats was taken, soaked in 10% formalin solution, decalcified with formic acid solution, embedded in paraffin, sliced, stained with HE and observed under microscope. The degree of joint injury was evaluated from four aspects: inflammatory cell infiltration, pannus formation, cartilage injury and bone resorption, and scored according to the standard of 0-4. The scoring criteria are as follows (table 9-3):

TABLE 9-3

Arthritis pathology scoring criteria

| Pathological changes | Pathological features | Score |
|---|---|---|
| Inflammatory cell infiltration | There is no visible inflammatory' cells | 0 |
| | Subsynovial cells are fibrotic and there is a very small amount of cell infiltration | 1 |
| | Synovial cells are proliferated and there is a small amount of monocytes infiltration | 2 |
| | Synovial cells are proliferated and there is a large number of monocytes, plasma cells and lymphocytes infiltration | 3 |
| | There is a large number of inflammatory cells infiltration around the joint, tissue fibrosis and synovial thickening | 4 |

TABLE 9-3-continued

Arthritis pathology scoring criteria

| Pathological changes | Pathological features | Score |
|---|---|---|
| Pannus formation | There is no pannus formation | 0 |
| | Avery small amount of pannus is formed at the edge of cartilage | 1 |
| | Fibrous tissue between cartilage is proliferated, and there is a small amount of pannus formed at the edge of the joint | 2 |
| | Pannus is formed on the surface of 50% articular cartilage | 3 |
| | Pannus formation can be seen on the whole articular cartilage surface | 4 |
| Cartilage injury | There is no visible cartilage damage | 0 |
| | Articular chondrocyte is proliferated | 1 |
| | Chondrocyte matrix is lost and there is a small number of chondrocytes destroyed | 2 |
| | Fibrous tissue around the joint is proliferated and there is a large number of chondrocytes destroyed | 3 |
| | There are a lot of fibrous tissue hyperplasia and cartilage erosion between articular cartilages | 4 |
| Bone resorption | There is no visible bone resorption | 0 |
| | A very small amount of bone resorption can be seen at the edge of synovium | 1 |
| | A small amount of osteoclasts can be seen in a small area of bone tissue | 2 |
| | There is bone resorption at local subchondral bone tissue | 3 |
| | There is bone resorption occurs in a wide range of bone tissues, accompanied by cartilage erosion | 4 |

6. Statistical Processing

The experimental data were expressed by mean±standard error (Mean±SEM), and the weight, clinical score and pathological score were analyzed by one-way ANOVA, (P<0.05) was considered significant difference.

Experimental Result

1. Clinical Score

In this experiment, the effect of compound of formula (I) on improving clinical score in rat arthritis (AIA) model was evaluated, with Dexamethasone and Filgotinib as reference. On the $6^{th}$ day after adjuvant immunization, the rats began to have arthritis symptoms. After administration on the $13^{th}$ day, the average clinical score of the solvent control group gradually increased. The experimental results showed that the average clinical score of the solvent control group peaked on the $24^{th}$ day and maintained at about 8 points, marking the successful establishment of AIA model (Table 9-4).

At the end point (the $27^{th}$ day), the compound of formula (I) significantly inhibited the clinical scores of arthritis rats at four doses of 1, 3, 10 and 30 mg/kg (P<0.0001 compared with the solvent control group), and reduced the clinical scores of arthritis rats to 5.4, 3.9, 3.2 and 2.7 respectively in a dose-dependent manner (P<0.0001 compared with the high-dose group and the low-dose group). Among them, the effect of compound of formula (I) 30 mg/kg is the most obvious (from the $17^{th}$ day, there is a very significant difference compared with the solvent control group, P<0.0001). The average arthritis clinical score of this group decreased from the peak of 6.0 on the $13^{th}$ day to 2.7 on the $27^{th}$ day (Table 9-4). The score of reference compound Filgotinib 30 mg/kg BID decreased to 5.1 on the experimental end point on the $27^{th}$ day, which was significantly lower than that of solvent control group (P<0.001), but significantly higher than that of compound of formula (I) 30 mg/kg BID (P<0.001). The improvement effect of the compound of formula (I) on the clinical score of arthritis is significantly better than that of Filgotinib at the same dose.

The average clinical score of the positive control Dexamethasone treatment group reached the highest value of 6.0 points after the $13^{th}$ day. After administration, the clinical score continued to decline to 2.7 points on the experimental end point on the $27^{*h}$ day. From the $17^{th}$ day, there was a very significant difference compared with the solvent control group (Table 9-4).

2 Foot Volume

This experiment evaluated the effect of compound of formula (I) on foot volume in rat arthritis (AIA) model, with Dexamethasone and Filgotinib as the reference. The average foot volume of animals in the solvent control group increased steadily from 1.9 mL on day 13 to 2.9 mL at the end of the experiment on the $27^{th}$ day, marking the successful establishment of AIA model (table 9-5). At the end of the experiment, the compound of formula (I) could significantly inhibit the increase of foot volume of arthritis rats at the doses of 1, 3, 10 and 30 mg/kg (P<0.0001 compared with the solvent control group), and the average foot volume of arthritis rats decreased to 1.91 mL, 1.59 mL, 1.26 mL and 1.21 mL respectively in a dose-dependent manner (P<0.0001 compared with the high-dose group and the low-dose group). The reference compound Filgotinib 30 mg/kg BID decreased to 1.91 points at the experimental end point on the $27^{th}$ day, which was significantly lower than that of the solvent control group (P<0.0001), but significantly higher than that of compound of formula (I) 30 mg/kg BID (P<0/0001). The effect of compound of formula (I) on the improvement of rat foot volume is significantly better than that of Filgotinib at the same dose. The positive control Dexamethasone treatment group also well inhibited the increase of the average foot volume. After administration, the foot volume decreased steadily and maintained at 1.21 mL until the end of the experiment. From the $17^{th}$ day, there was a very significant difference compared with the solvent control group, P<0.0001 (Table 9-5)

3 Weight

Compared with the normal group, the body weight of rats after immune modeling decreased. After administration on the 13th day, the body weight of each administration group increased slowly and continuously compared with the solvent control group, while the body weight of the positive control Dexamethasone group recovered slowly. This result suggests that rats have good tolerance to Filgotinib and the compounds of formula (I). The body weight of compound of formula (I) 30 mg/kg group increased the fastest, and the trend of body weight increasing at four doses showed a dose-dependent relationship (table 9-6).

4 Histopathological Test Results

The total pathological score of arthritis rats in the solvent control group was 16±0.00. The score of compound of formula (I) was reduced to 13.3±0.44 at the dose of 1 mg/kg (P=0.09 compared with the solvent control group), and the inhibition rate was 16.9%. At the doses of 3 mg/kg, 10 mg/kg and 30 mg/kg, the pathological scores of arthritis rats were significantly reduced to 11.3±1.64, 4.4±1.16 and 1.6±0.47, respectively. The P values were 0.014, <0.0001 and <0.0001, respectively. The inhibition rates were 29.4%, 72.5% and 90%. The total pathological score of reference compound Filgotinib 30 mg/kg was 15.2±0.49, and the inhibition rate was 5%. There was no significant difference compared with the solvent group. The total pathological score of the compound of formula (I) at the same dose (30 mg/kg) was significantly lower than that of Filgotinib (P<0.0001). The control compound Dexamethasone of 0.3 mg/kg significantly reduced the pathological score of arthritis rats to 4.4±0.8, P<0.0001, and the inhibition rate was 72.5% (Table 9-7).

| Day | Normal group | | Solvent control group | | Dexamethasone acetate group (0.3 mg/kg) | | Filgotinib (30 mg/kg) | |
|---|---|---|---|---|---|---|---|---|
| | Means | Standard error | Means | Standard error | Means | Standard error | Means | Standard error |
| 13 | 0 | 0 | 6.1 | 0.5 | 6.0 | 0.5 | 6.0 | 0.6 |
| 15 | 0 | 0 | 7.3 | 0.4 | 5.3* | 0.5 | 6.6 | 0.5 |
| 17 | 0 | 0 | 7.6 | 0.4 | 4.1**** | 0.5 | 6.3 | 0.6 |
| 20 | 0 | 0 | 7.8 | 0.4 | 3.4**** | 0.5 | 5.8** | 0.6 |
| 22 | 0 | 0 | 8.0 | 0.4 | 3.1**** | 0.5 | 5.5*** | 0.6 |
| 24 | 0 | 0 | 8.1 | 0.3 | 3.1**** | 0.5 | 5.4**** | 0.5 |
| 27 | 0 | 0 | 8.1 | 0.3 | 2.9**** | 0.5 | 5.1**** | 0.5 |

| Day | Compound of formula (1) (1 mg/kg) | | Compound of formula (1) (3 mg/kg) | | Compound of formula (1) (10 mg/kg) | | Compound of formula (1) (30 mg/kg) | |
|---|---|---|---|---|---|---|---|---|
| | Means | Standard error | Means | Standard error | Means | Standard error | Means | Standard error |
| 13 | 6.0 | 0.5 | 6.0 | 0.6 | 6.0 | 0.5 | 6.0 | 0.5 |
| 15 | 6.9 | 0.5 | 5.8 | 0.5 | 5.5* | 0.4 | 4.5*** | 0.4 |
| 17 | 6.7 | 0.4 | 5.4** | 0.5 | 4.4**** | 0.4 | 3.1**** | 0.2 |
| 20 | 6.0* | 0.4 | 4.1**** | 0.4 | 3.8**** | 0.2 | 3.0**** | 0.2 |
| 22 | 5.8** | 0.4 | 4.0**** | 0.4 | 3.7**** | 0.3 | 2.8**** | 0.2 |
| 24 | 5.6*** | 0.4 | 4.0**** | 0.4 | 3.4**** | 0.2 | 2.7**** | 0.2 |
| 27 | 5.4**** | 0.3 | 3.9**** | 0.4 | 4.2**** | 0.1 | 7.7**** | 0.2 |

*$p < 0.05$,
**$p < 0.01$,
***$p < 0.001$,
****$p < 0.0001$ vs. Solvent control gzoup, one-way ANOVA

TABLE 9-5

Foot volume

| Day | Normal group | | Solvent control group | | Dexamethasone acetate group (0.3 mg/kg) | | Filgotinib (30 mg/kg) | |
|---|---|---|---|---|---|---|---|---|
| | Means | Standard error | Means | Standard error | Means | Standard error | Means | Standard error |
| 13 | 1.1 | 0.0 | 1.9 | 0.1 | 1.9 | 0.1 | 1.9 | 0.1 |
| 15 | 1.1 | 0.0 | 2.3 | 0.1 | 1.7**** | 0.1 | 2.2 | 0.1 |
| 17 | 1.1 | 0.0 | 2.4 | 0.1 | 1.4**** | 0.1 | 2.0** | 0.1 |
| 20 | 1.0 | 0.0 | 2.5 | 0.1 | 1.3**** | 0.1 | 1.9**** | 0.1 |
| 22 | 1.1 | 0.0 | 2.6 | 0.1 | 1.3**** | 0.1 | 2.0**** | 0.1 |
| 24 | 1.1 | 0.0 | 2.8 | 0.1 | 1.2**** | 0.1 | 2.0**** | 0.1 |
| 27 | 1.1 | 0.0 | 2.9 | 0.1 | 1.2**** | 0.1 | 1.9**** | 0.1 |

TABLE 9-5-continued

| | Foot volume | | | | | | | |
|---|---|---|---|---|---|---|---|---|
| | Compound of formula (I) (1 mg/kg) | | Compound of formula (I) (3 mg/kg) | | Compound of formula (I) (10 mg/kg) | | Compound of formula (I) (30 mg/kg) | |
| Day | Means | Standard error | Means | Standard error | Means | Standard error | Means | Standard error |
| 13 | 1.9 | 0.1 | 1.9 | 0.1 | 1.9 | 0.1 | 1.9 | 0.1 |
| 15 | 2.2 | 0.1 | 2.0* | 0.1 | 1.8*** | 0.1 | 1.6**** | 0.1 |
| 17 | 2.0** | 0.1 | 1.9**** | 0.1 | 1.6**** | 0.1 | 1.4**** | 0.1 |
| 20 | 1.9**** | 0.1 | 1.8**** | 0.1 | 1.5**** | 0.1 | 1.3**** | 0.1 |
| 22 | 2.0**** | 0.1 | 1.7**** | 0.1 | 1.4**** | 0.1 | 1.2**** | 0.0 |
| 24 | 2.0**** | 0.1 | 1.6**** | 0.1 | 1.3**** | 0.1 | 1.2**** | 0.0 |
| 27 | 1.9**** | 0.1 | 1.6**** | 0.1 | 1.3**** | 0.0 | 1.2**** | 0.0 |

*$p < 0.05$, $p < 0.01$, *$p < 0.001$, ****$p < 0.0001$ vs Solvent control goup, one-way ANOVA.

TABLE 9-6

| | Weight | | | | | | | |
|---|---|---|---|---|---|---|---|---|
| | Normal group | | Solvent control group | | Dexamethasone acetate group (0.3 mg/kg) | | Filgotinib (30 mg/kg) | |
| Day | Means | Standard error | Means | Standard error | Means | Standard error | Means | Standard error |
| 0 | 177.6 | 2.0 | 182.0 | 2.3 | 182.2 | 2.7 | 182.7 | 2.9 |
| 13 | 210.2 | 3.4 | 168.1 | 3.3 | 169.1 | 2.5 | 168.0 | 3.0 |
| 15 | 209.8 | 3.1 | 167.7 | 3.1 | 162.4 | 2.1 | 167.5 | 2.9 |
| 17 | 212.5 | 2.7 | 168.0 | 3.0 | 160.5 | 1.5 | 168.3 | 3.0 |
| 20 | 216.9 | 3.7 | 166.9 | 3.0 | 161.6 | 2.2 | 169.7 | 2.8 |
| 22 | 218.8 | 3.1 | 168.9 | 3.0 | 163.5 | 2.2 | 171.2 | 2.6 |
| 24 | 218.7 | 3.5 | 171.7 | 2.7 | 163.7 | 2.0 | 174.3 | 3.7 |
| 27 | 220.1 | 3.7 | 177.2 | 2.8 | 163.4** | 2.7 | 181.7 | 3.5 |
| | Compound of formula (I) (1 mg/kg) | | Compound of formula (I) (3 mg/kg) | | Compound of formula (I) (10 mg/kg) | | Compound of formula (I) (30 mg/kg) | |
| Day | Means | Standard error | Means | Standard error | Means | Standard error | Means | Standard error |
| 0 | 182.0 | 1.6 | 187.0 | 2.2 | 181.6 | 2.2 | 181.2 | 2.3 |
| 13 | 168.0 | 1.3 | 169.6 | 1.4 | 168.5 | 2.5 | 169.3 | 2.2 |
| 15 | 170.1 | 2.0 | 172.3 | 1.5 | 171.1 | 2.7 | 174.8 | 2.2 |
| 17 | 168.9 | 1.5 | 170.9 | 1.7 | 175.2 | 2.7 | 180.6 | 2.4 |
| 20 | 168.1 | 1.5 | 172.8 | 1.5 | 179.9** | 3.3 | 188.9*** | 2.5 |
| 22 | 169.6 | 1.4 | 177.0 | 1.3 | 186.3**** | 3.5 | 196.0**** | 2.2 |
| 24 | 173.6 | 1.8 | 179.8 | 1.8 | 190.1**** | 2.5 | 198.8**** | 2.2 |
| 27 | 180.9 | 1.8 | 188.6* | 1.7 | 198.2**** | 2.9 | 206.3**** | 2.7 |

*$p < 0.05$, $p < 0.01$, *$p < 0.001$, ****$p < 0.0001$ vs. Solvent control group, one-way ANOVA

TABLE 9-7

| | Pathological score | | | | |
|---|---|---|---|---|---|
| | Pathlogical score (mean ± standard error) | | | | |
| Group | Inflammatory cell infiltration | Pannus formation | Cartilage injury | Bone resorption | Total score |
| Normal group | 0.0 ± 0.0 | 0.0 ± 0.0 | 0.0 ± 0.0 | 0.0 ± 0.0 | 0.0 ± 0.0 |
| Solvent control group | 4.0 ± 0.0 | 4.0 ± 0.0 | 4.0 ± 0.0 | 4.0 ± 0.0 | 16.0 ± 0.0 |
| Dexamethasone acetate group (0.3 mg/kg ) | 1.8 ± 0.2 | 1.4 ± 0.3 | 0.6 ± 0.2 | 0.6 ± 0.2 | 4.4 ± 0.8**** |

TABLE 9-7-continued

Pathological score

| Group | Pathlogical score (mean ± standard error) | | | | |
|---|---|---|---|---|---|
| | Inflammatory cell infiltration | Pannus formation | Cartilage injury | Bone resorption | Total score |
| Filgotinib (30 mg/kg) | 4.0 ± 0.0 | 3.9 ± 0.1 | 3.7 ± 0.2 | 3.6 ± 0.2 | 15.2 ± 0.5 |
| Compound of formula (I) (1 mg/kg) | 3.6 ± 0.3 | 3.5 ± 0.3 | 3.3 ± 0.4 | 2.9 ± 0.5 | 13.3 ± 1.4 |
| Compound of formula (I) (3 mg/kg) | 3.3 ± 0.3 | 3.2 ± 0.3 | 2.5 ± 0.5 | 2.3 ± 0.5 | 11.3 ± 1.6* |
| Compound of formula (I) (10 mg/kg) | 1.7 ± 0.3 | 1.4 ± 0.4 | 0.8 ± 0.3 | 0.5 ± 0.3 | 4.4 ± 1.2**** |
| Compound of formula (I) (30 mg/kg) | 0.6 ± 0.2 | 0.5 ± 0.2 | 0.3 ± 0.1 | 0.2 ± 0.1 | 1.6 ± 0.5**** |

*p < 0.05,
****p < 0.001, v.s. solvent control, One-way ANOVA

Conclusion: the rats in the solvent control group had the clinical symptoms of arthritis and continue to aggravate. Compared with the solvent control group, compounds of formula (I) (1, 3, 10, 30 mg/kg), Filgotinib (30 mg/kg) and Dexamethasone (0.3 mg/kg) showed significant inhibitory effects on adjuvant induced arthritis, which showed delayed onset time and reduced clinical symptoms and pathological changes significantly. The therapeutic effect of the compound of formula (I) on adjuvant induced arthritis model was dose-dependent. The above experimental results show that the compound of formula (I) has obvious therapeutic effect on adjuvant induced arthritis in rats, and the effect is better than Filgotinib.

What is claimed is:

1. A crystal form A of compound of formula (I) that has an X-ray powder diffraction (XRPD) spectrum comprising characteristic diffraction peaks at the following 2θ angles: 6.91±0.20°, 12.21±0.20°, 13.69±0.20°, 19.06±0.20°, 19.86±0.20°, 20.59±0.20°, 22.06±0.20° and 27.52±0.20°:

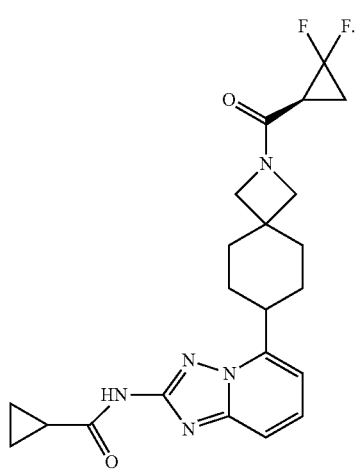

(I)

2. The crystal form A according to claim 1, wherein the XRPD spectrum further comprises characteristic diffraction peaks at the following 2θ angles: 10.34±0.20°, and 18.11±0.20°.

3. The crystal form A according to claim 2, wherein the XRPD spectrum further comprises characteristic diffraction peaks at the following 2θ angles: 17.44±0.20°, and 24.46±0.20°.

4. The crystal form A according to claim 1, wherein it has a differential scanning calorimetry (DSC) curve comprising an endothermic peak value respectively at 152.19±3° C. and 216.79±3° C. and an exothermic peak value at 161.50±3° C.

5. A crystal form B of the compound of formula (I) that has an XRPD spectrum comprising characteristic diffraction peaks at the following 2θ angles: 5.13±0.20°, 7.34±0.20°, 10.14±0.20°, 10.56±0.20°, 11.72±0.20°, 16.67±0.20°, 19.14±0.20° and 21.18±0.20°:

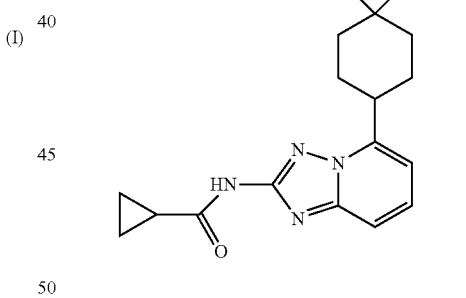

(I)

6. The crystal form B according to claim 5, wherein the XRPD spectrum further comprises characteristic diffraction peak at the following 2θ angle: 21.78±0.20°.

7. The crystal form B according to claim 5, wherein it has a DSC curve comprising an endothermic peak value respectively at 193.99±3° C. and 216.93±3° C. and an exothermic peak value at 200.10±3° C.

8. The crystal form B according to claim 5, wherein it has a thermogravimetric analysis curve (TGA) showing a weight loss of up to 0.535% at 120±3° C.

9. A crystal form C of the compound of formula (I), that has an XRPD spectrum comprising characteristic diffraction peaks at the following 2θ angles: 5.76±0.20°, 8.92±0.20°, 11.50±0.20°, 16.35±0.20°, 18.66±0.20°, 19.17±0.20°, 20.26±0.20° and 24.79±0.20°:

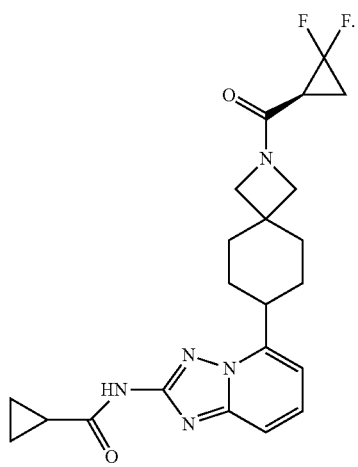

10. The crystal form C according to claim 9, wherein it has a DSC curve comprising a starting point of endothermic peak at 215.48° C.

11. A crystal form D of the compound of formula (I), that has an XRPD spectrum comprising characteristic diffraction peaks at the following 2θ angles: 7.12±0.20°, 12.45±0.20°, 14.64±0.20°, 18.31±0.20°, 20.54±0.20°, 21.42±0.20° and 28.72±0.20°:

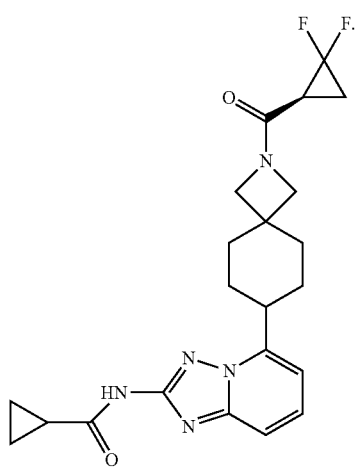

12. The crystal form D according to claim 11, wherein the XRPD spectrum further comprises characteristic diffraction peaks at the following 2θ angles: 10.28±0.20°, and 17.50±0.20°.

13. A method of treating a JAK1 and/or TYK2 related disease, wherein the JAK1 and/or TYK2 related disease is rheumatoid arthritis, the method comprising administering
a crystal form A of compound of formula (I) that has an XRPD spectrum comprising characteristic diffraction peaks at the following 2θ angles: 6.91±0.20°, 12.21±0.20°, 13.69±0.20°, 19.06±0.20°, 19.86±0.20°, 20.59±0.20°, 22.06±0.20° and 27.52±0.20°;

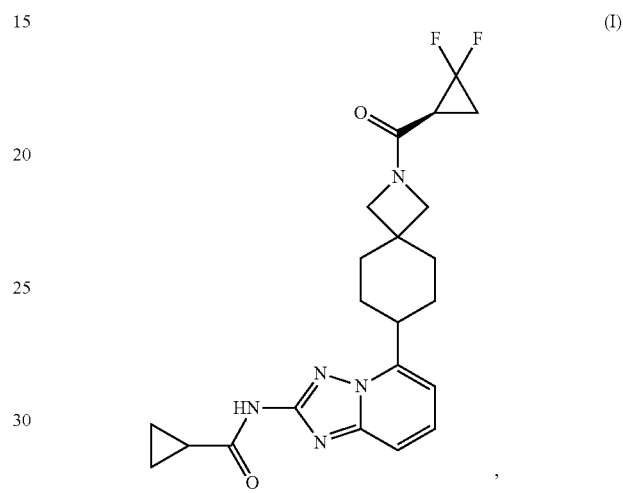

a crystal form B of the compound of formula (I) that has an XRPD spectrum comprising characteristic diffraction peaks at the following 2θ angles: 5.13±0.20°, 7.34±0.20°, 10.14±0.20°, 10.56±0.20°, 11.72±0.20°, 16.67±0.20°, 19.14±0.20° and 21.18±0.20°, a crystal form C of the compound of formula (I), that has an XRPD spectrum comprising characteristic diffraction peaks at the following 2θ angles: 5.76±0.20°, 8.92±0.20°, 11.50±0.20°, 16.35±0.20°, 18.66±0.20°, 19.17±0.20°, 20.26±0.20° and 24.79±0.20°, and/or a crystal form D of the compound of formula (I), that has an XRPD spectrum comprising characteristic diffraction peaks at the following 2θ angles: 7.12±0.20°, 12.45±0.20°, 14.64±0.20°, 18.31±0.20°, 20.54±0.20°, 21.42±0.20° and 28.72±0.20°.

* * * * *